(12) United States Patent
Schaepkens et al.

(10) Patent No.: US 11,099,280 B2
(45) Date of Patent: Aug. 24, 2021

(54) X-RAY DETECTOR AND METHODS OF FORMING X-RAY DETECTOR

(71) Applicant: GE Precision Healthcare LLC, Milwaukee, WI (US)

(72) Inventors: Marc Schaepkens, Brookfield, WI (US); William Andrew Hennessy, Troy, NY (US); Douglas Albagli, Clifton Park, NY (US); Ahmet Gun Erlat, Latham, NY (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 0 days.

(21) Appl. No.: 16/734,154

(22) Filed: Jan. 3, 2020

(65) Prior Publication Data
US 2021/0208292 A1    Jul. 8, 2021

(51) Int. Cl.
*G01T 1/20* (2006.01)
*G01T 1/24* (2006.01)

(52) U.S. Cl.
CPC .............. *G01T 1/2006* (2013.01); *G01T 1/24* (2013.01)

(58) Field of Classification Search
CPC ................................ G01T 1/2006; G01T 1/24
See application file for complete search history.

(56) References Cited

U.S. PATENT DOCUMENTS

| | | |
|---|---|---|
| 6,608,312 B1 * | 8/2003 | Okada ...................... G01T 1/20 250/370.11 |
| 7,015,640 B2 | 3/2006 | Schaepkens et al. |
| 7,397,183 B2 | 7/2008 | Schaepkens et al. |
| 7,449,246 B2 | 11/2008 | Kim et al. |
| 7,486,020 B2 | 2/2009 | Schaepkens et al. |
| 8,227,984 B2 | 7/2012 | Kim et al. |
| 8,383,214 B2 | 2/2013 | Schaepkens et al. |
| 8,455,041 B2 | 6/2013 | Schaepkens et al. |
| 8,691,371 B2 | 4/2014 | Kim et al. |
| 2005/0098732 A1 | 5/2005 | Liu et al. |
| 2017/0329023 A1 * | 11/2017 | Homma ................ G01T 1/2018 |
| 2018/0026145 A1 * | 1/2018 | Kamakura ................ G01J 1/44 257/432 |

* cited by examiner

*Primary Examiner* — Kiho Kim

(57) ABSTRACT

Methods and systems are provided for imaging assemblies including different layers. The layers include a planar layer positioned on imaging components. A scintillator layer is positioned above the planar layer and a sealing layer is positioned above the scintillator layer.

18 Claims, 18 Drawing Sheets

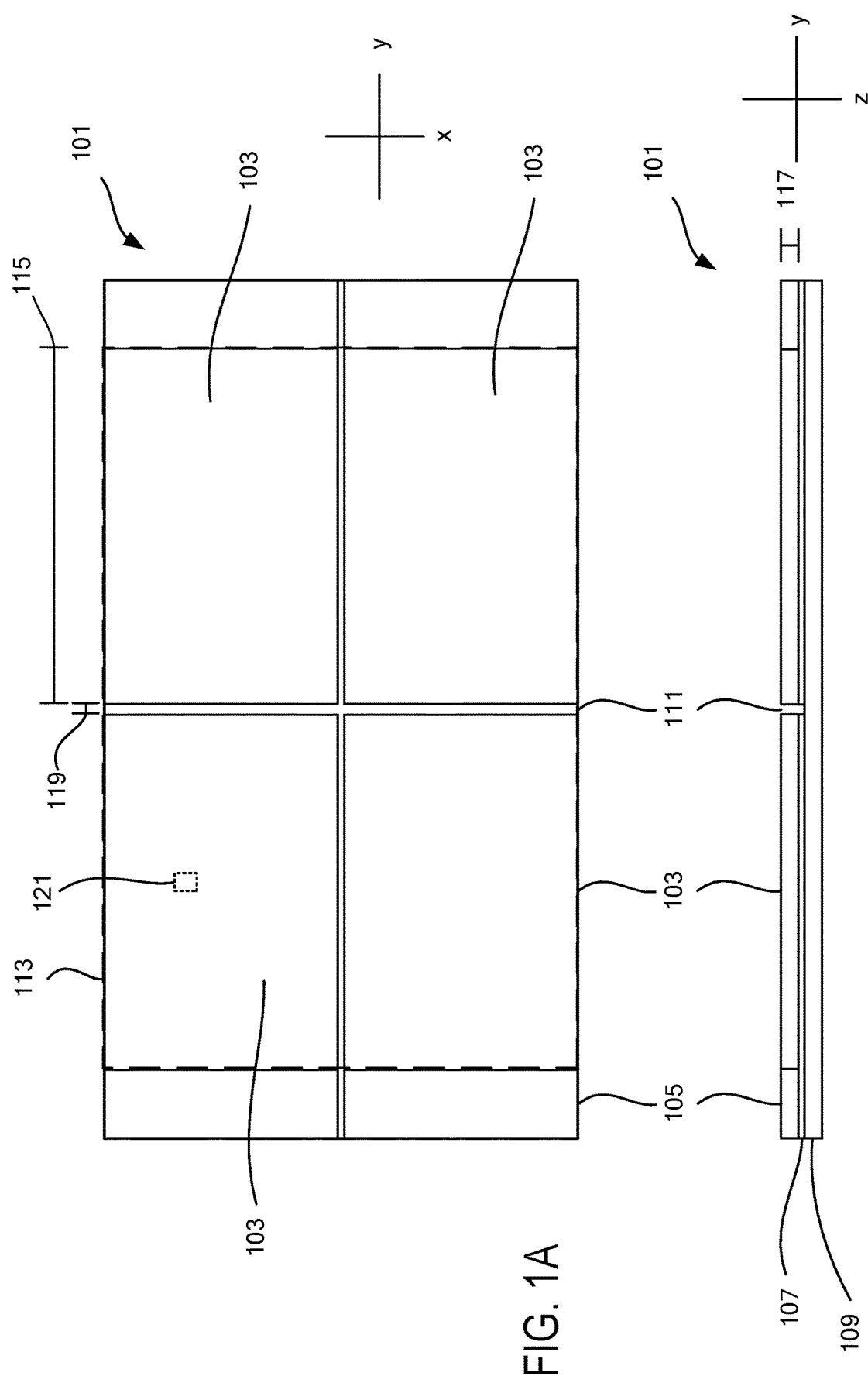

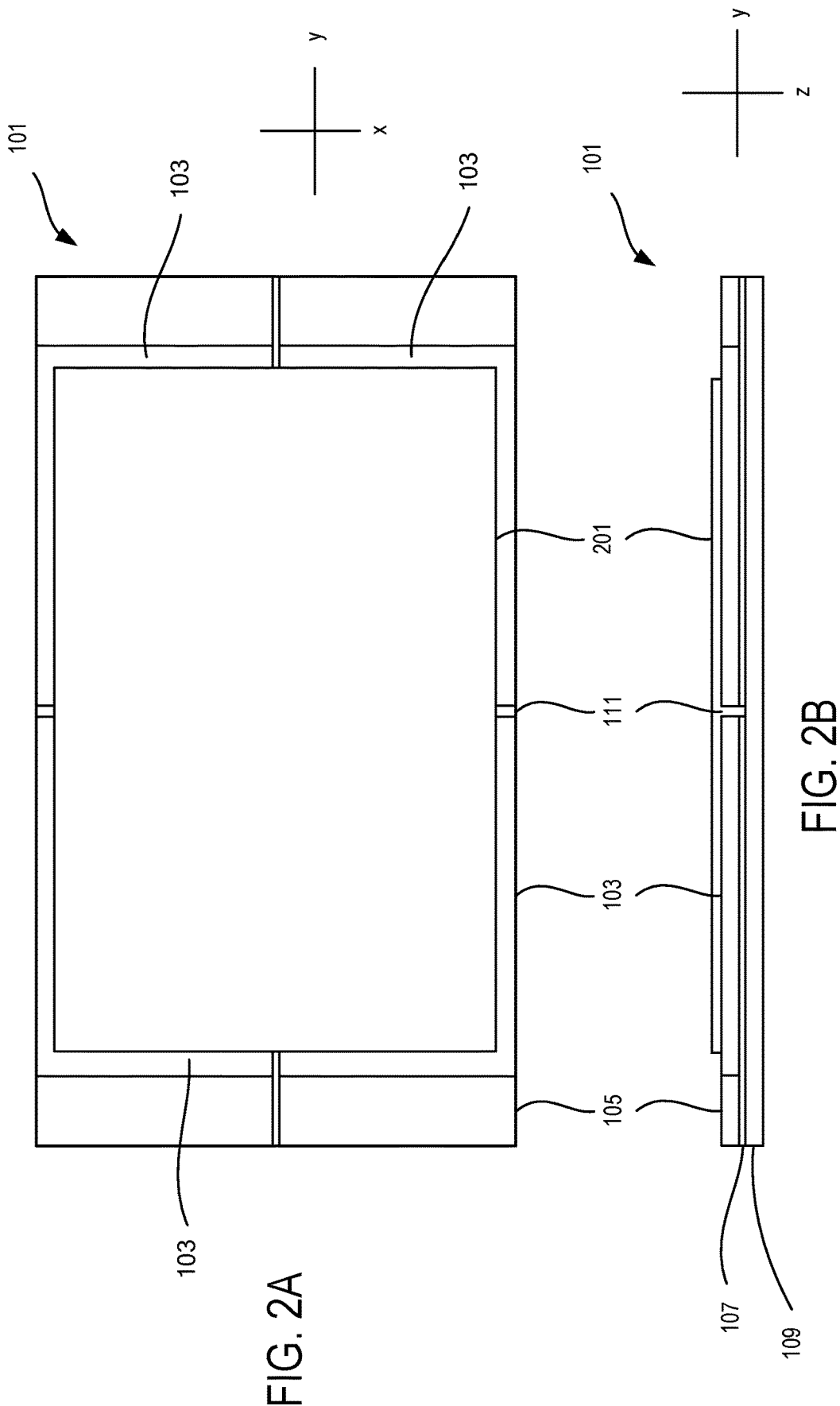

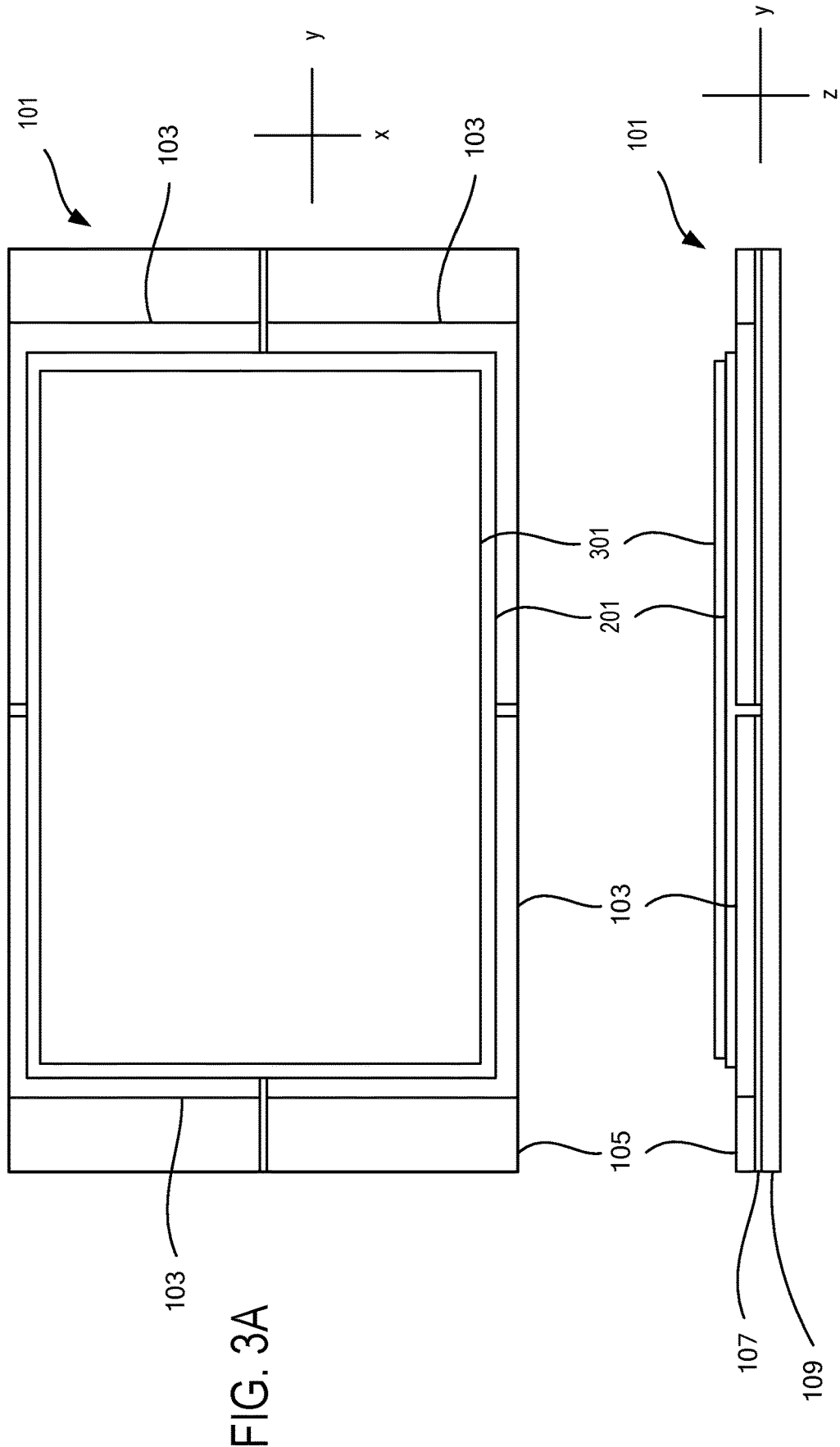

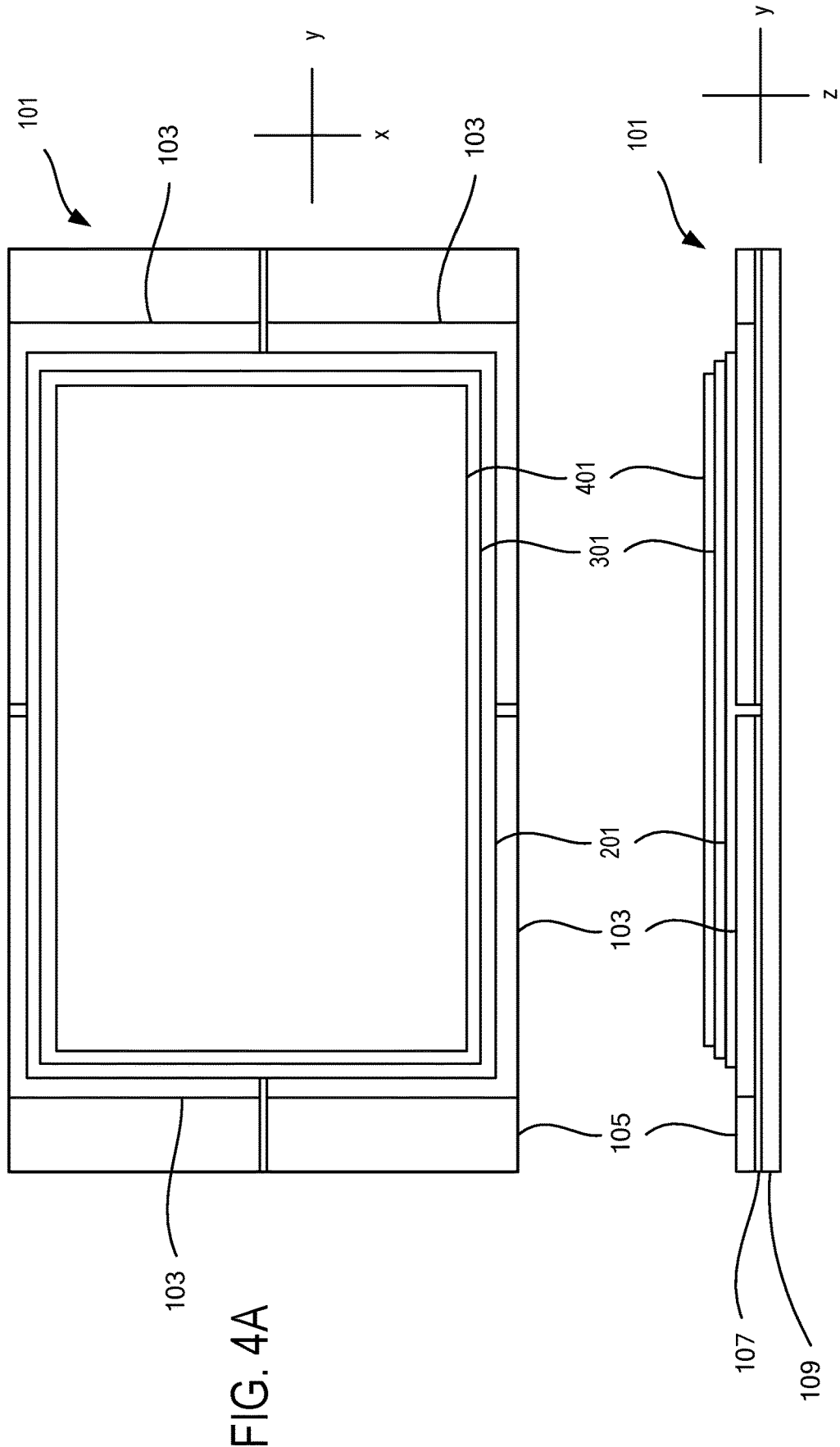

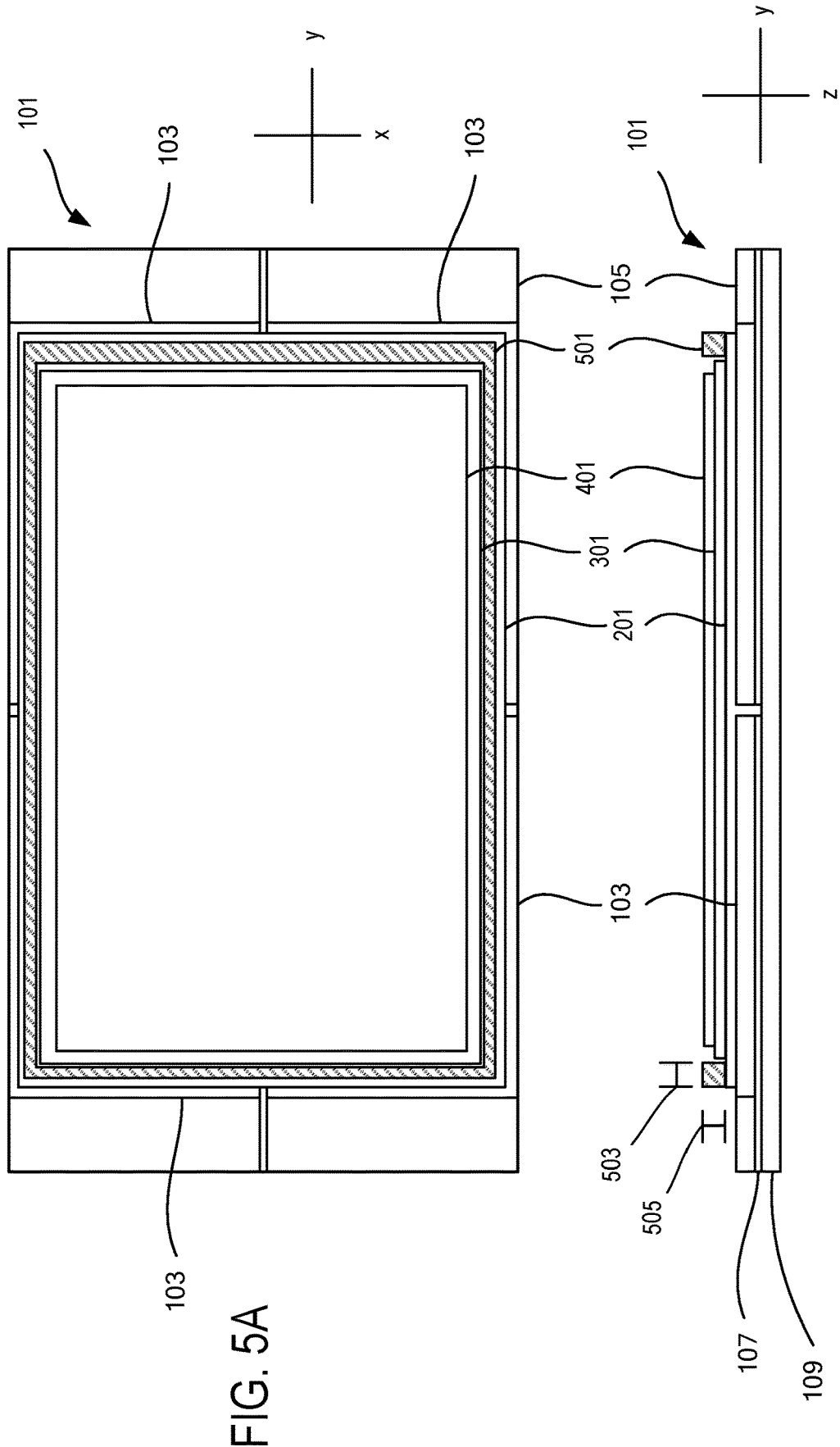

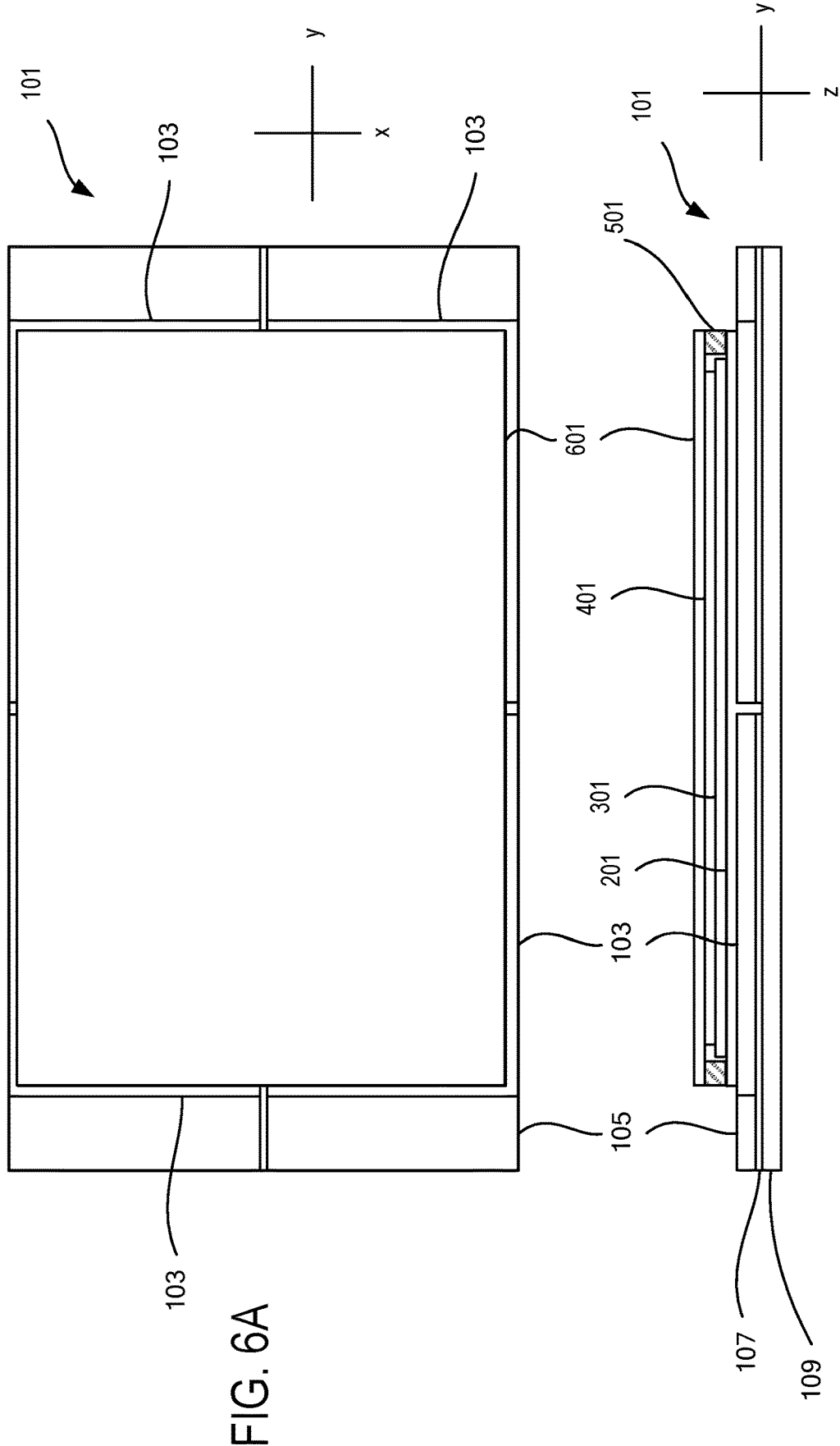

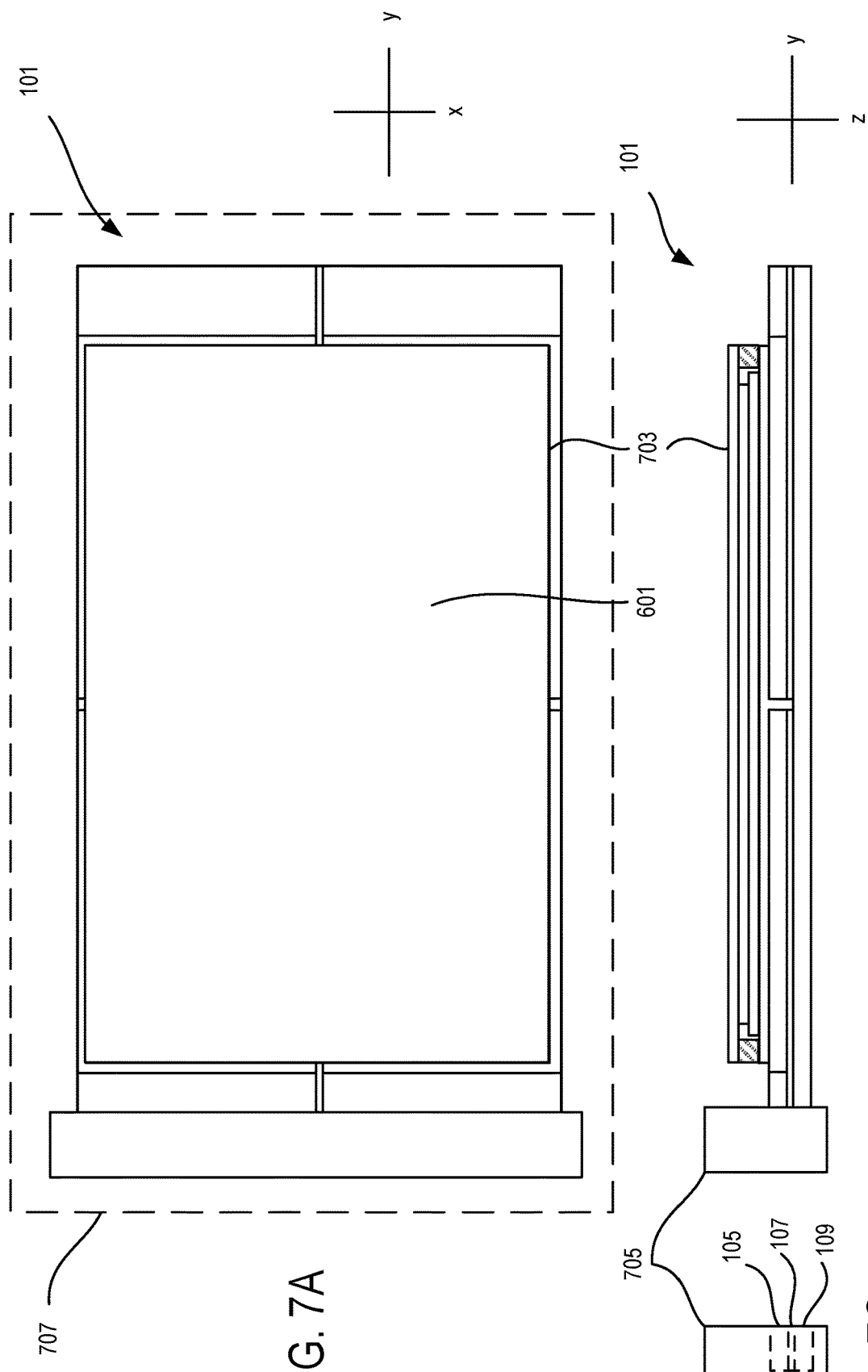

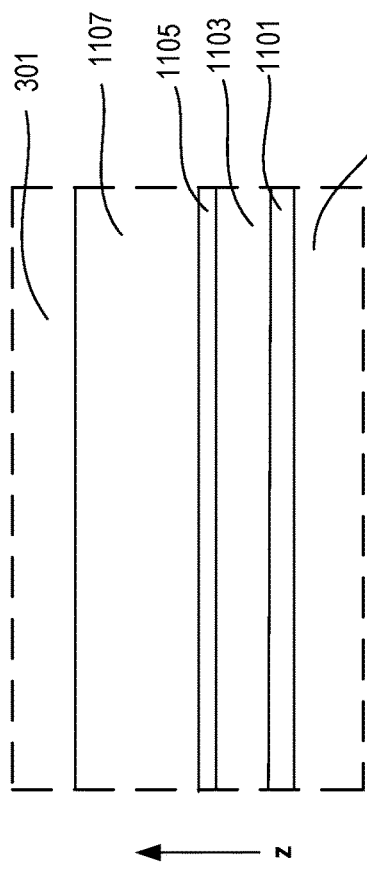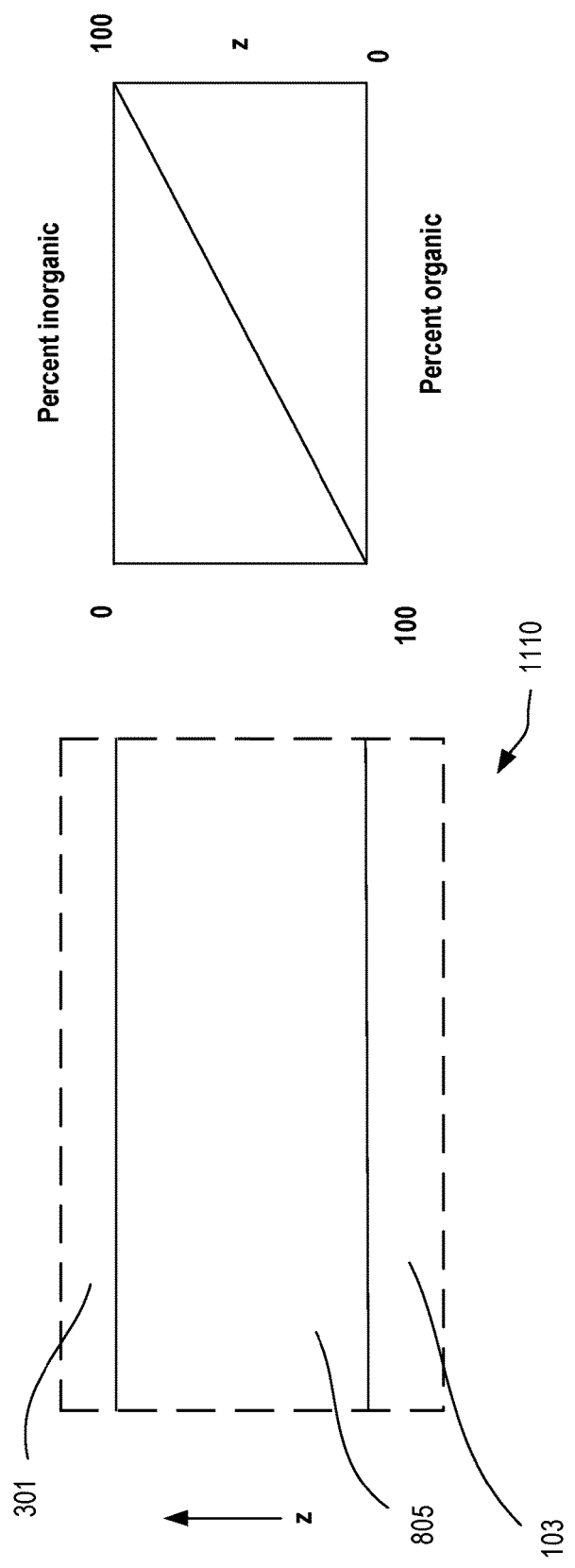
FIG. 11A
FIG. 11B

X-RAY DETECTOR AND METHODS OF FORMING X-RAY DETECTOR

TECHNICAL FIELD

The present description relates generally to medical or industrial imaging and X-Ray detectors.

DISCUSSION OF ART

Detectors may use an array of photosensitive tiles or panels to provide a desired area for detection. A scintillator layer or x-ray sensitive material may be layered onto one side of the array of photosensitive tiles. Materials, layers, and/or components may be positioned between the array of photosensitive tiles and the scintillator layer in order to address problems observed when placing the scintillator layer directly on the array of photosensitive tiles.

SUMMARY

The present disclosure at least partially addresses these problems. One embodiment of the disclosure includes a X-ray detector comprising a gap filling material positioned in at least one gap between two or more photosensor tiles, a barrier layer comprising inorganic material, and a first face of the barrier layer extending across the at least one gap and a face of each of the two or more photosensor tiles, a first face of a scintillator layer positioned on a second face of the barrier layer, and a perimeter seal surrounding the scintillator layer, and a first face of a diffusion resistant layer positioned on a second face of the scintillator layer opposite the first face of the scintillator layer.

The above advantages and other advantages and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

FIGS. 1A and 1B depict a top view and a side view of an embodiment of an X-ray detector including photosensor tiles, electronics, and a substrate.

FIGS. 2A and 2B depict a top view and a side view of an embodiment of an X-ray detector including a barrier layer applied to photosensor tiles.

FIGS. 3A and 3B depict a top view and a side view of an embodiment of an X-ray detector including a scintillator layer applied to a barrier layer.

FIGS. 4A and 4B depict a top view and a side view of an embodiment of an X-ray detector including a reflector layer applied to a scintillator layer.

FIGS. 5A and 5B depict a top view and a side view of an embodiment of an X-ray detector including a perimeter seal applied around other layers.

FIGS. 6A and 6B depict a top view and a side view of an embodiment of an X-ray detector including a diffusion resistant layer applied to other structures including a perimeter seal.

FIGS. 7A and 7B depict a top view and a side view of an embodiment of an X-ray detector including an end cap.

FIG. 7C depicts a side view of an embodiment of an endcap with a backing substrate, read out electronics, and adhesive within the endcap.

FIG. 11A depicts an embodiment of coatings applied to a photosensor tile.

FIG. 11B depicts an embodiment of a coating applied to a photosensor tile and a graph of a composition of the coating.

FIGS. 1-11B are shown approximately to scale

DETAILED DESCRIPTION

Figure 8A:
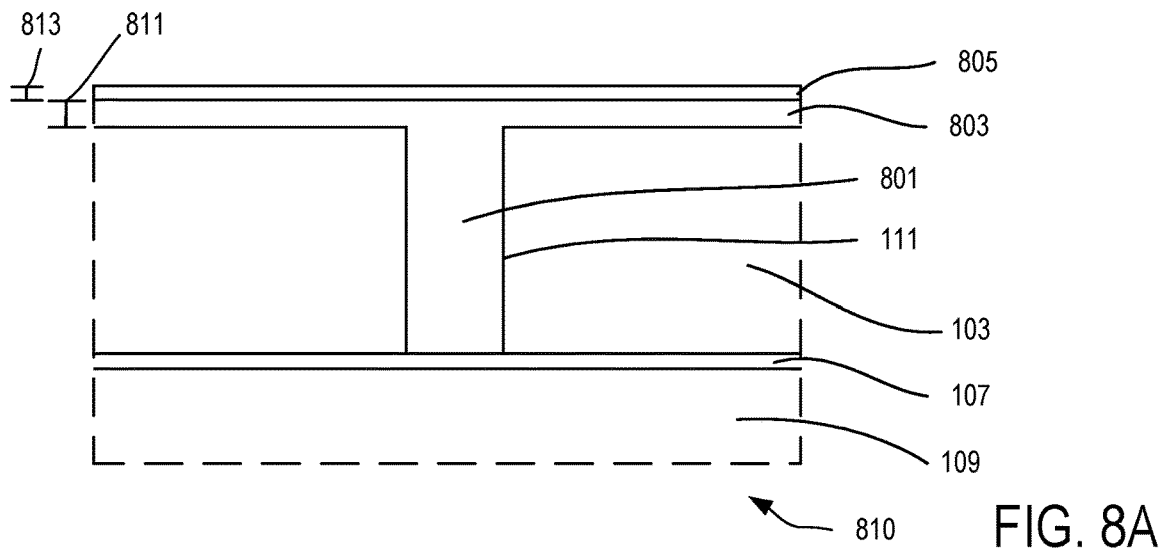
FIGS. 8A-8H depict cross-sectional views of various embodiments of coatings applied to photosensor tiles.

The following description relates to detectors and methods for forming detectors. The embodiments described help to address problems such anomalous material growth around photosensor tile gaps and moisture ingress through materials. FIGS. 1A-7B depict various embodiments of layers and components used to form detectors. Embodiments of methods of application of these various layers are depicted in flow charts of FIGS. 12-14. FIGS. 8A-8H depicts embodiments of various coatings that can be used to form a leveling and/or protection layer on photosensor tiles, similarly to the embodiment shown in FIGS. 2A and 2B. FIGS. 11A and 11B depict further embodiments of a coating stack 1110 including barrier and leveling coatings applied to the photosensor tiles. FIGS. 9A-9F depict various embodiments of gap filling materials applied to fill the gaps between photosensor tiles and help to prevent anomalous growth during later processes. FIGS. 10A-10D depict various embodiments of application of perimeter seals that help to prevent moisture ingress into scintillator materials.

FIGS. 1A and 1B depicts an embodiment of a X-ray detector 101 comprising photosensor tiles 103, read out electronics 105, an adhesive layer 107, and a backing substrate 109. The photosensor tiles may also be referred to as imaging panels or other similar terminology. The photosensor tiles 103 are positioned such that gaps 111 remain between the photosensor tiles 103. FIG. 1 depicts an embodiment of an X-ray detector 101 wherein the photosensor tiles 103 are approximately equal size and are positioned with approximately equal spacing on the X-ray detector 101. However, other embodiments may include a photosensor tile 103 that is significantly larger than other photosensor tiles 103 and therefore takes up a majority of the X-ray detector 101. In an embodiment wherein one photosensor tile 103 is larger, the spacing of the panels on the X-ray detector 101 would not be uniform. The photosensor tiles 103 may be arranged differently in other embodiments without departing from the scope of the application.

FIGS. 1A and 1B depict an axis system that will be used to describe embodiments of the application. The x-axis and y-axis extend in perpendicular directions of which the X-ray detector 101 extends. The z-axis extends perpendicular to the x-axis and y-axis and extends through the X-ray detector 101 perpendicular to a top and bottom face of the X-ray detector 101.

Photosensor tiles 103 may be formed of many types of light imaging devices and materials including silicon-based complementary metal oxide semiconductor (CMOS). CMOS designs provide high-quality imaging but present manufacturing challenges because silicon based panels may only be formed to certain dimensions. For example, some manufacturers only produce silicon wafer sizes of 12 inches or less. A detecting area 113 may be composed of the total area of photosensor tiles 103 in an x-direction and y-direction and may have dimensions of up to approximately 50×50 cm. A photosensor tile 103 may be rectangular and have side lengths 115 in the x-direction or y-direction of approximately 6-20 cm. Other shapes of photosensor tiles 103 may also be used, such as rounded or square. Photosensor tiles 103 may have a thickness 117 in a z-direction of approximately 100-500 μm.

The array of photosensor tiles 103 may abut each other to form a gap 111 less than 50 μm. In one embodiment, two, four, or 6 light panels may be used.

Gaps 111 may be formed between photosensor tiles 103 due to photosensor tiles not being large enough to cover the detecting area 113 with a single photosensor tile 103. Therefore, an array of photosensor tiles 103 may be required. These gaps 111 present manufacturing challenges that will be discussed below.

The dimensions of gaps 111 will vary depending on application. The gaps 111 will extend between photosensor tiles 103, depicted as the x-direction and y-direction, and therefore will vary depending on the size of photosensor tiles 103. In some embodiments, the gaps will extend into the read out electronics, while in other embodiments the gaps will not. The width of the gaps 111 between the photosensor tiles will depend on the pixel size of the photosensor tiles used in the application. The width of the gap will generally be approximately equal to the width of a pixel but may also be less than a width of a pixel. Pixel sizes and therefore gap widths 119 may vary between approximately 5 to 50 μm. The gap widths 119 may be up to 100 μm in other embodiments.

The depth of the gap will be a function of the thickness of photosensor tiles 103 and in some embodiments the adhesive. The thickness of the photosensor tiles 103 may vary from approximately 100-500 μm. The depth of the gap will therefore be the thickness of the photosensor tiles 103 plus a thickness of adhesive 107 in embodiments where the gap extends to the backing substrate 109.

A pixel 121 is depicted schematically in FIG. 1A. A pixel is the smallest element with a given photosensor tile 103. It may also be described as an individual photosite within photosensor tile 103.

Photosensor tiles 103 are mounted onto a backing substrate 109 using an adhesive 107. Embodiments of the application may use many types of backing substrates and adhesives to support the photosensor tiles 103. Backing substrate 109 may be composed of glass, metal, composites, plastic, metal alloy or a combination of materials. Adhesive 107 may be composed of many types of materials and will depend on the photosensor tiles 103 and backing substrate 109 being used. The thickness of the backing substrate 109 and adhesive 107 will vary depending on application and materials used. For example, a portable unit may use a thinner backing substrate to conserve weight. The area dimensions, depicted in the x-axis and y-axis, of the backing substrate and adhesive will be approximately the total area of the photosensor tiles 103, read out electronics 105, and the gaps 111.

Read out electronics 105 process signals transmitted from the connected photosensor tiles 103. Read out electronics 105 may consist of circuits designed to processes the signal or a processor and memory storing instructions for processing signal of photosensor tiles 103. The read out electronics are mounted on the backing substrate 109 adjacent to the photosensor tiles 103. The read out electronics 105 may be positioned in many different configurations relative to the photosensor tiles 103 without departing from the scope of the application. The read out electronics 105 may have length dimensions, depicted in the x-direction and y-direction, between approximately 2-50 cm, depending on application. The thickness of the read out electronics 105, depicted in the z-direction may be similar to that of the photosensor tiles 103 but need not be.

Many methods and materials for x-ray imaging exists including direct conversion with Selenium and Cadmium Zinc Telluride component. Indirect conversion with Cesium iodide (CsI) or Gadolinium OxiSulfide (GOS) scintillator and light imaging components of amorphous silicon flat panel or crystalline silicon (CMOS) components may also be used. A combination of CMOS and CsI has a potential to offer high image quality in comparison to alternative materials. However, previous attempts to form a combination CMOS and CsI proved complex, costly and image quality degrading. One of these previous attempts included applying a monolithic, uniform scintillator material on top of the light imaging sub-components.

Silicon based light imaging elements must often be constructed in arrays because silicon wafer size often has a maximum size of approximately 8-12 inches. Applications such as medical or industrial imaging often require an imaging device larger than the maximum wafer size. Large size imagers are also particularly beneficial for x-ray imaging because x-rays are not able to be focused efficiently, unlike visible light. Therefore, the active area of the detectors is often required to be as large at the object being imaged. A plurality of silicon light imager wafer elements are joined together by abutting the elements to one another to form a larger surface area and address the sizing problems described above. This approach leads to having spaces or gaps between the abutting elements.

Anomalous growth often results when applying a scintillator material to an array of panels with gaps. This anomalous growth leads to image quality artifacts occurring at the seams between the panels. Previous attempts to overcome the issue use a fiber optic plate (FOP) as a leveling medium on which the scintillator layer can be deposited. The FOP is costly and causes another mode of image quality degradation via light spreading.

Another attempt to address the anomalous growth problem is to laminate the array of panels. The laminate approach also degrades image quality due to light spreading in the adhesive used for lamination, and reflections at air boundaries between the laminate layer and photosensor tile surface.

Yet another attempt to address the anomalous growth problem uses a material to fill gaps between sensors. A passivation coat is then applied to the assembly, and an x-ray sensitive material is applied to the top of the assembly to form an X-ray array sensor.

Attempts to address the anomalous growth problem, such as those discussed above, do not realize an additional problem of degradation of the scintillator materials due to ingress of undesired materials. X-ray sensitive or scintillator materials may degrade when contacted by water and other problematic materials. In other words, many scintillator materials are moisture sensitive. The previous attempts do not prevent diffusion of water or other problematic molecules into the scintillator materials and therefore would yield an x-ray imager with a limited lifetime. Imagers using scintillator materials such as CsI will degrade in performance if not adequately protected from moisture ingress.

FIGS. 2A and B depict an embodiment of an X-ray detector 101 with a barrier layer 201 applied. The barrier layer 201 reduces the permeation rate of water vapor and other unwanted materials through the barrier layer 201. The barrier layer 201 is applied onto at least photosensor tiles 103 and covers gaps 111. In some embodiments, the barrier layer 201 covers the read out electronics 105 while in other embodiments the barrier layer 201 does not. Therefore, the area dimensions of the barrier layer 201, depicted in the x-axis and y-axis, may be a function of the area of components such as photosensor tiles 103 and the gaps 111. In some embodiments the area of the barrier layer 201 will be less than the sum of the photosensor tiles 103, as depicted in FIG. 2A. In other embodiments, the barrier layer may be equal to or greater than the area of the photosensor tiles 103 and gaps 111.

In some embodiments of the present application, the barrier layer 201 contacts the adhesive layer while in other embodiments the barrier layer 201 contacts the backing substrate 109. The barrier layer 201 within the gap will be discussed in further detail in regards to FIGS. 9A-9F.

The thickness of the barrier layer 201 may be less than 10 μm. In embodiments were the barrier layer 201 is comprised of two or more individual layers, the total thickness may still be less than 10 μm. Thickness of layers within barrier layer 201 will be discussed in further detail in regards to FIGS. 8A-8H.

The barrier layer 201 may also contain a leveling coating with a planarizing function. The leveling coating may contain at least one resin. The resin may be an epoxy based resin, such as a cycloaliphatic resin, or an acrylic based resin. The composition of the leveling coating may further include at least one agent which makes the leveling coating more flexible, at least when applied. This agent may be referred to herein as a flexibilizing agent. The composition of the barrier layer 201 may also include an adhesion promoter, surfactant, catalyst and combinations of the aforementioned components. Embodiments of the composition may be composed of a form of Parylene. The barrier layer 201 may also include components that prevent or retard moisture water vapor and other problematic substances from passing through the barrier layer 201. These properties of the barrier layer may form a protective structure with a perimeter seal and diffusion resistant layer around a scintillator. These details will be discussed in greater detail below.

The barrier layer 201 may reduce diffusion rates of chemical species through the layer. The substantially impermeable material may comprise a single discrete zone comprised of a material that reduces diffusion, or a multilayer structure of materials that reduce diffusion, or a material with a composition that varies across a thickness of the layer. Materials that prevent substances or materials from passing through them may be referred to herein as a "diffusion-barrier material."

The barrier layer 201 may composed of different regions of materials, distinct layers of materials or gradients of materials. The composition of barrier layer 201 will be discussed in further detail in regards to FIGS. 8A-8H and FIGS. 11A and 11B.

FIGS. 3A and 3B depict an embodiment of an X-ray detector 101 including a scintillator layer 301 positioned on top of barrier layer 201. The scintillator layer 301 may be deposited directly onto barrier layer 201 or deposited onto another surface and moved onto the barrier layer 201. The scintillator layer 301 thickness, depicted in the z-axis, will vary depending on application and material used and can range from 100-1000 μm. The scintillator layer 301 may have area dimensions, depicted in the x-axis and y-axis, smaller than that of barrier layer 201 so that a perimeter seal may be applied outside of the scintillator layer 301. The perimeter seal will be discussed in further detail in regards to FIGS. 10A-10D.

The scintillator layer 301 may be composed of one or more of many x-ray sensitive materials including phosphors, Cesium iodide (CsI), Gadolinium OxiSulfide (GOS). Scintillator materials are commonly moisture sensitive and performance of an imager may degrade over time as moisture moves into scintillator materials. Therefore, embodiments of the application make use of structures such as the barrier layer 201, perimeter seals and diffusion resistant layer to prevent or slow the rate of moisture entering the scintillator materials.

FIGS. 4A and 4B depict an embodiment of an X-ray detector 101 including reflective layer 401 positioned on the scintillator layer 301. Embodiments of the reflective layer may be a diffuse or spectral reflective layer comprised of an organic or inorganic material with greater than 75% reflection in the optical spectrum.

The dimensions of reflector layer 401 will vary depending on application. In embodiments where the reflective layer 401 is within a perimeter seal, then the area dimensions, depicted in the x-axis and y-axis, will be smaller than the interior surfaces of the perimeter seal. Similarly, the area dimensions of reflective layer 401 may also be dictated by the scintillator layer 301 in embodiments where reflective layer 401 is positioned on the scintillator layer 301. The thickness of reflective layer 401, depicted in the z-axis, will vary depending on application and materials used and may range from approximately 0.1-0.3 mm.

FIGS. 5A and 5B depict an embodiment of an X-ray detector 101 including a perimeter seal 501 positioned on a barrier layer 201 and exterior to scintillator layer 301 and reflector layer 401. As noted in the description in FIG. 2, the barrier layer 201 may exhibit moisture barrier qualities. Thus, the perimeter seal and barrier layer may act to prevent moisture from reaching the scintillator. In other embodiments, the perimeter seal may be positioned on a component besides the barrier layer 201 but in contact with exterior surfaces of the barrier layer 201.

The perimeter seal 501 may be composed of many diffusion resistant materials such as epoxies, polyurethanes, silicones and combinations thereof. These materials may prevent water and other problematic molecules from diffusing through them. Epoxies of the perimeter seal 501 may include Bisphenol-based epoxy, Aliphatic epoxy, Halogenated epoxy, Glycidylamine epoxy, epoxy, acrylates epoxy, and cationic epoxy.

Dimensions of embodiments of the perimeter seal 501 will vary depending on components such as the barrier layer 201, scintillator layer 301 and any layers within the boundary of the perimeter seal 501. In embodiments where the perimeter seal 501 is positioned on barrier layer 201, the exterior area dimensions of the perimeter seal 501, depicted in the x-axis and y-axis, will be approximately the same or less than the barrier layer 201. Similarly, in embodiments where the scintillator layer 301 is within the perimeter seal 501, the interior area dimensions of the perimeter seal 501, depicted in the x-axis and y-axis, will be greater than the area dimensions of the scintillator layer 301.

The width 503 of perimeter seal 501 will depend on the application and materials used. As discussed above, the exterior and interior area dimensions of the perimeter seal 501 vary depending on dimensions of components such as the barrier layer 201 and scintillator layer 301. Therefore, the width 503 of the perimeter seal 501 will vary depending on these exterior and interior area dimensions. An approximate width 503 of the perimeter seal 501 may be between 1-10 mm.

Similarly, thickness 505 of perimeter seal 501 will vary depending on the components within the perimeter seal 501. As will be discussed in FIGS. 6A and 6B, a diffusion resistant layer is positioned on perimeter seal 501. Therefore, the thickness 505 of perimeter seal 501 is approximately the same as or greater than a sum of the thickness of the components within the perimeter seal 501. In the embodiment depicted in FIG. 5B, the thickness 505 is the sum of the thickness of scintillator layer 301 and reflector layer 401. An approximate range for the thickness 505 of perimeter seal 501 may be between 0.1-1 mm.

FIGS. 6A and 6B depict an embodiment of an X-ray detector 101 including a diffusion resistant layer 601 positioned on perimeter seal 501. The diffusion resistant layer 601 may be composed of many diffusion resistant materials such as metal, glass, composites and combinations thereof. These materials may specifically prevent or slow down diffusion of water and other problematic substances. As can be seen in FIG. 6B, the diffusion resistant layer 601, perimeter seal 501, and barrier layer 201 may form a moisture or vapor resistant layer surrounding the scintillator layer 301. Thus, embodiments of scintillator layer 301 that include moisture sensitive materials may be protected from exposure and degradation.

The area dimensions of diffusion resistant layer 601, depicted in the x-axis and y-axis, vary depending on dimensions of perimeter seal 501. Thus, the dimensions of diffusion resistant layer 601 will be similar to the outer area dimensions of perimeter seal 501 but may be greater than or less than the dimensions depending on surrounding structures. The thickness of diffusion resistant layer 601 will vary depending on application and materials used. The thickness of diffusion resistant layer 601 may vary between approximately 0.1-3 mm.

FIGS. 7A and 7B depict an imaging device 707 including an embodiment of a X-ray detector 101 including endcaps 703 positioned around an exterior of components such as the diffusion resistant layer 601 and backing substrate 109. The endcaps 703 may serve to provide structural support for other components of the X-ray detector 101. The endcaps 703 may also serve to provide an area for handling of the X-ray detector 101. Endcaps 703 may extend along any number of sides of the X-ray detector 101 including only one side or around all four sides. The area dimensions, depicted in the x-axis and y-axis, and thickness dimensions of endcaps 703, depicted in the z-axis, will vary depending on application and materials used. However, the endcaps 703 extends along a perimeter of X-ray detector 101 and therefore interior dimensions of the endcap will be dictated by exterior dimensions of other layers of X-ray detector 101.

For example, interior dimensions of the endcaps 703 may be the sum of the thickness of the other layers of X-ray detector 101.

FIG. 7C depicts the backing substrate 109, read out electronics 105, and adhesive 107 within an endcap 705.

FIG. 8A depicts a layered stack 810 comprising photosensor tiles 103, adhesive 107, backing substrate 109, and gap 111 similarly to the elements shown in FIGS. 1A and 1B to aid in understanding of embodiments of the application. However, the embodiments of FIG. 8A and other FIGS. need not be the same. Further, layered stack 810 might not be a discrete component but is depicted in FIG. 8A illustrate a close-up view of the structures surrounding the gap 11. Similarly, the gap filling material 801, leveling coating 803, and barrier coating 805 may make up a barrier layer, depicted as barrier layer 201 in FIGS. 2A and 2B, but the embodiments depicted in FIG. 8A and FIGS. 2A and 2B need not be the same. As shown, the barrier coating may be formed as a continuous sheet extending over the photosensor tiles and one or more gap between the photosensor tiles.

Figure 8B:
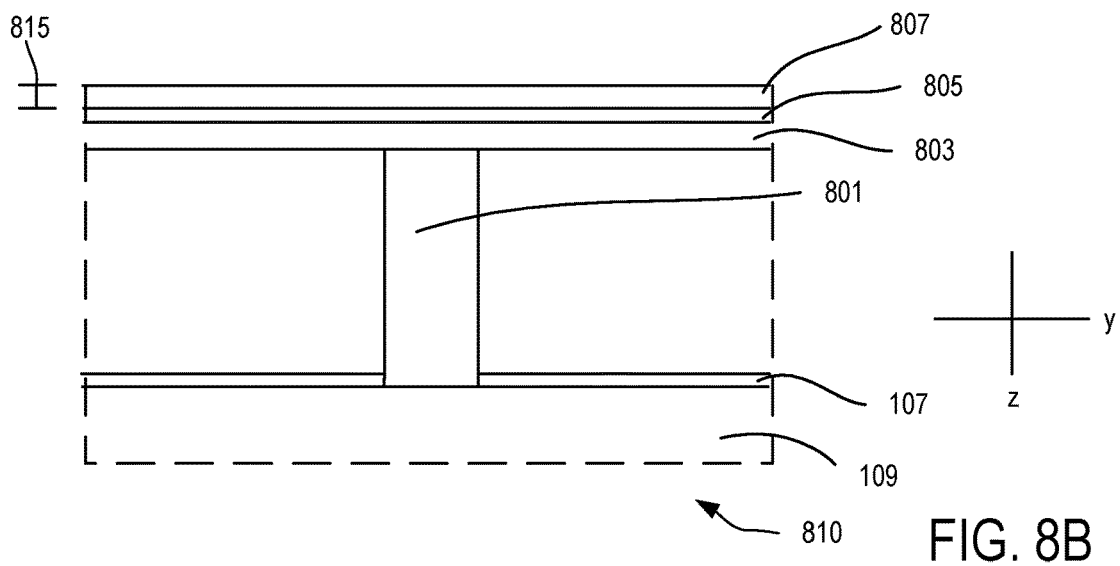

FIG. 8A depicts a gap filling material 801 positioned in a gap 111 between photosensor tiles 103. The gap filling material may contact an adhesive layer 107, as depicted in FIG. 8A, or a backing substrate 109, as depicted in FIG. 8B.

The gap filling material 801 may be deposited in a same process as leveling coating 803 or in a different process. Similarly, the gap filling material 801 may be composed of the same material as leveling coating 803, as depicted in FIG. 8A, or a different material than the leveling coating 803, as depicted in FIG. 8B. One or both of the leveling coating 803 and barrier coating 805 may be laminated.

The gap filling material 801 and leveling coating 803 may be composed of organic, inorganic materials, and organic/inorganic combinations.

Further embodiments may also include one or more additional elements. These additional elements may include an adhesion layer, an adhesion promoter, a wetting agent or surfactant, and a flexibilizing agent.

The leveling coating 803 may be applied using processes in order to ensure a minimum surface roughness. Embodiments of the leveling coating may exhibit surface roughness of less than 1 um, and other embodiments may exhibit surface roughness less than 100 nm or 10 nm. Most commonly used roughness values are average roughness and root-mean-square roughness and the evaluation area size would need to be reported along with the roughness values. The key performance criteria for the leveling coating is to enable the barrier coating to perform to desired levels.

Preferred level of barrier performance is water vapor transmission rate (WVTR) less than $1 \times 10^{-5}$ g/m$^2$/day measured at 30 C and 100% relative humidity.

In embodiments where the gap filling material 801 fills the entire gap 111, the dimensions of gap filling material will be dictated by the size of the gap 111. In other embodiments, the gap filling material 801 will not completely fill gap 111 or gap filling material 801 will extend beyond gap 111. Embodiments where the gap filling material 801 is not defined by the size of the gap will be discussed in reference to other FIGS., such as FIGS. 9B-9F.

The area dimensions of levelling coat 803 will be similar to the area dimensions of the barrier layer 201 described in regards to FIG. 2. The area dimensions of the barrier layer 201 may be a function of the area of components such as photosensor tiles 103 and the gaps 111. In some embodiments the area of the barrier layer 201 will be less than the sum of the photosensor tiles 103. In other embodiments, the barrier layer may be equal to or greater than the area of the photosensor tiles 103 and gaps 111 and may extend onto components such as read out electronics.

The thickness dimension of leveling coating 803 will vary depending on application and materials used. The thickness 811 of leveling coating 803 may specifically depend on if a barrier coating 805 and/or a protective coating is used in conjunction with the leveling coating 803. The thickness 811 of the leveling coating 803 will be referred to as a distance the leveling coating 803 extends above photosensor tiles 103, depicted in the z-direction. The thickness 811 of the leveling coating 803 may range from approximately 1 nm to 20 µm. More specific ranges for the thickness 811 of the leveling coating 803 may include 1-100 um, 100 nm-10 µm, and 500 nm-5 µm. Other embodiments of the leveling coating 803 will have a thickness of less than 10 µm to alleviate a potential problem of light spreading caused by layers between a scintillator and photosensor tiles 103.

Embodiments of barrier coating 805 may be composed of only inorganic materials. The use of inorganic materials in barrier coating 805 may increase the performance of the barrier coating 805 in preventing or delaying water and other problematic molecules form passing through the barrier coating 805. Other embodiments of barrier coating 805 may include organic materials with inorganic materials. Organic compounds may aid in providing material traits such as flexibility required for application of the barrier coating 805. Further embodiments, may include a laminate layer provided on the barrier coating 805 and may include the leveling coating 803 also being laminated.

Still further embodiments of barrier coating 805 may include a gradient of components. FIG. 11B depicts an embodiment OF a coating stack 1110 in which the barrier coating 805 is composed of only organic materials near a face of barrier coating 805 that contacts photosensor tile 103. The composition of barrier coating 805 depicted in FIG. 11B transitions from only organic materials to only inorganic materials as the barrier coating 805 extends in a z-direction towards a scintillator layer 301. The graph on the right side of FIG. 11B depicts the transition of the composition of barrier coating 805 in a z-direction.

Still further embodiments the barrier coating 805 may include alternating layers of predominantly organic and inorganic materials. Predominantly organic and inorganic materials as referred to herein will refer to material with approximately 75% or more of the recited material. For example, a predominantly inorganic layer will have approximately 75% or more inorganic compounds. Substantially organic and substantially inorganic materials are likewise defined as approximately 75% or more of the recited material unless otherwise defined.

FIG. 11A depicts an embodiment where a barrier coating is comprised of four layer: a first predominantly inorganic layer 1101, a first predominantly organic layer 1103, a second predominantly inorganic layer 1105, and a second predominantly organic layer 1107. The four layers may be positioned between other layers such as the photosensor tiles 103, scintillator 301, a leveling coating, or a protective coating. The thickness of the organic layers and inorganic layers may vary. As depicted in FIG. 11A, some embodiments of barrier coatings will include inorganic layers that are substantially thinner than organic layers. For example, inorganic layers, depicted as 1101 and 1105 in FIG. 11A, may have thickness dimensions ranging from approximately 10-100 nm while organic layers 1103 and 1107 may have thickness dimensions ranging from approximately 10 nm-1 µm.

FIG. 8B depicts an embodiment of a layered stack 810 including a protective coating 807 positioned on barrier coating 805. The protective coating 807 can be composed of the same or different materials from the gap filling material 801 and/or leveling coating 803. Similarly, the process of application for protective coating 807 may be the same as the process used to apply the gap filling material 801 and/or leveling coating 803. Embodiments of the protective coating 807 may be composed of predominantly organic materials. The organic materials of the protective coating 807 may be similar to those of the gap filling material 801 and leveling coating 803 but need not be the same. In one embodiment, the gap filling material 801 may be composed of one organic material, the leveling coating 803 may be composed of a second organic material, and the protective coating 807 may be composed of a third organic material.

The thickness 815 of the protective coating 807 will vary depending on materials an application. The thickness 815 of the protective coating 807 may approximately equal to or less than 20 µm in some embodiments. In further embodiments the thicknesses 811, 813, and 815 of the leveling coating 803, barrier coating 805 and protective coating 807 respectively may be chosen such that a total thickness is below a threshold. In one embodiment, the sum of thicknesses 811, 813, and 815 may be less than 10 µm to avoid light spreading. In other embodiments, only one layer, such as barrier coating 805 may be used and the thickness 813 chosen to be below a threshold. In other embodiments, two layers may be used, such as the leveling coating 803 and barrier coating 805, and the sum of the thicknesses 811 and 813 may be below a threshold such as 10 µm.

Figure 8C:
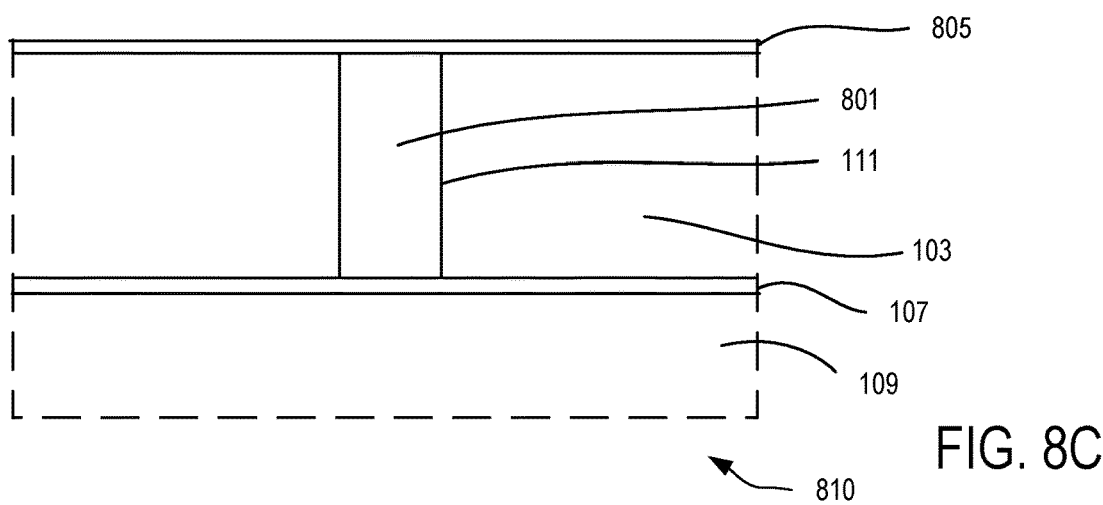

FIG. 8C depicts an embodiment of a layered stack 810 including a barrier coating 805 applied on photosensor tiles 103 and a gap filling material 801. In contrast to the embodiments of FIGS. 8A and 8B, the barrier coating 805 is not separated from the photosensor tiles 103 and a gap filling material 801 by a leveling coating 803. The barrier coating 805 may otherwise be similar to the embodiments described in regards to FIGS. 8A and 8B.

Figure 8D:
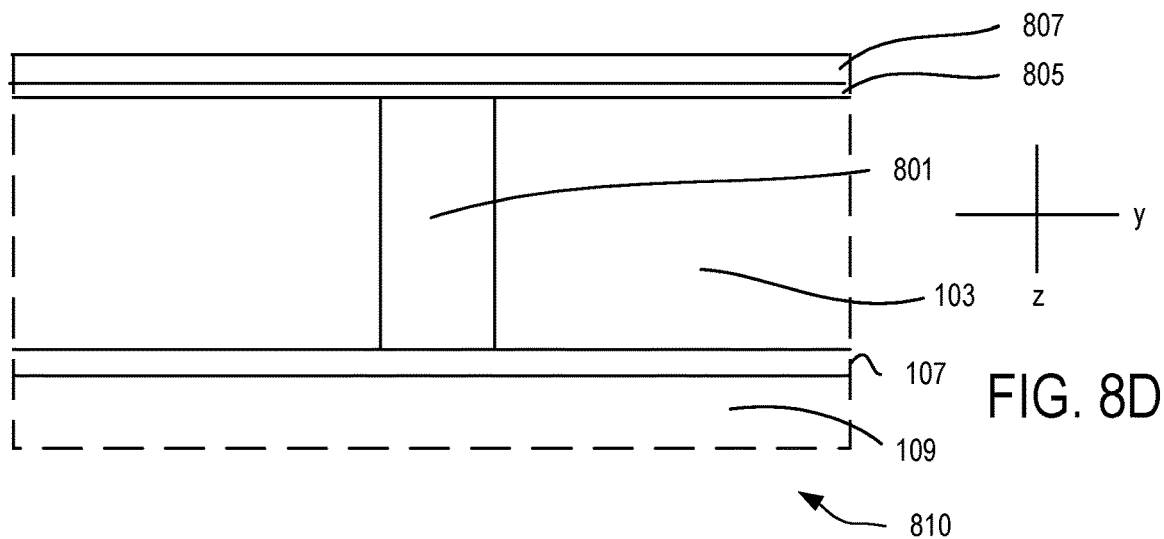

FIG. 8D depicts an embodiment of a layered stack 810 similar to that of FIG. 8C. However, the embodiment depicted in FIG. 8D includes a protective coating 807 positioned on a barrier coating 805. The gap filling material 801, barrier coating 805, and protective coating 807 may be composed of materials as described in previous embodiments, such as those of FIGS. 8A-8C.

Figure 8E:
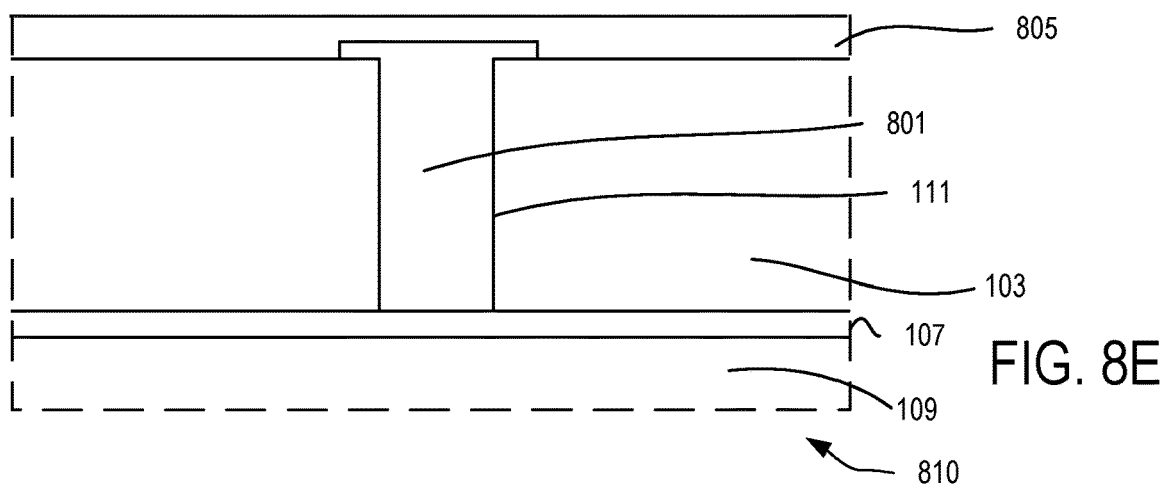

FIG. 8E depicts an embodiment of a layered stack 810 where the gap filling material 801 extends beyond the gap 111 between photosensor tiles 103. Embodiments where the gap filling material 801 extends beyond the gap 111 may be referred to as overfill of gap filling material 801. In the embodiment depicted in FIG. 8E, the barrier coating 805 is applied over the overfilled gap filling material 801. As can be seen the gap filling material 801 extends beyond the gap 111 in both the y-axis and z-axis. The overfill of the gap filling material 801 may also extend beyond a gap 111 in an x-axis, in other portions of the photosensor tiles 103. In other embodiments, the overfilled gap filling material 801 may be etched off before application of the barrier coating 805. Embodiments where the overfilled gap filling material is etched may be similar to the embodiment depicted in FIG. 8C.

Figure 8F:
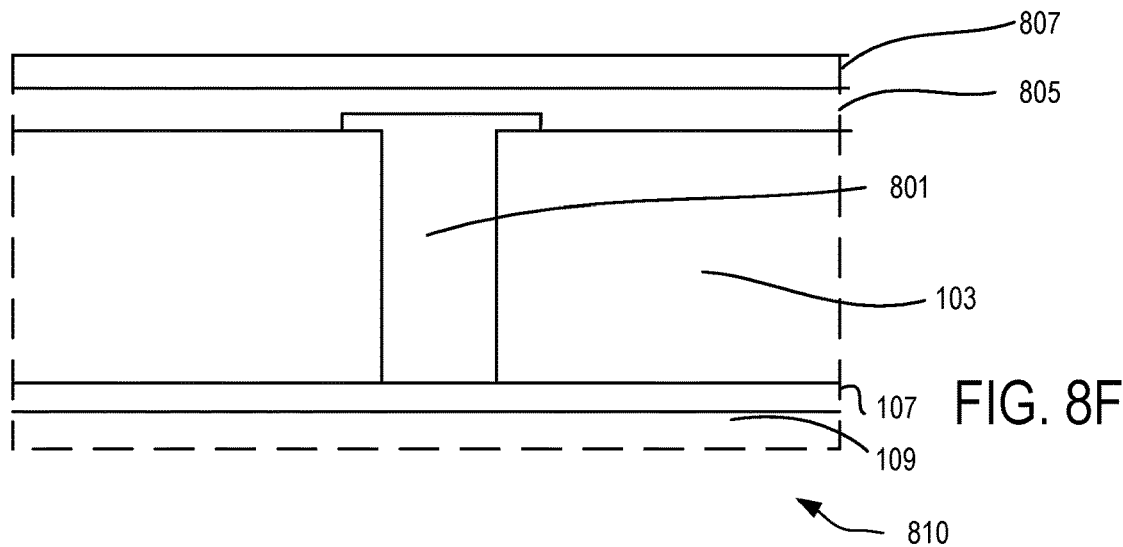

FIG. 8F depicts an embodiment of a layered stack 810 similar to that of FIG. 8E. However, the embodiment depicted in FIG. 8F includes a protective coating 807 positioned on a barrier coating 805. The barrier coating 805 and protective coating 807 may be composed of materials as described in previous embodiments such as described in regards to FIGS. 8A-8E. The gap filling material 801 may be similar to that described in FIG. 8E.

Figure 8G:
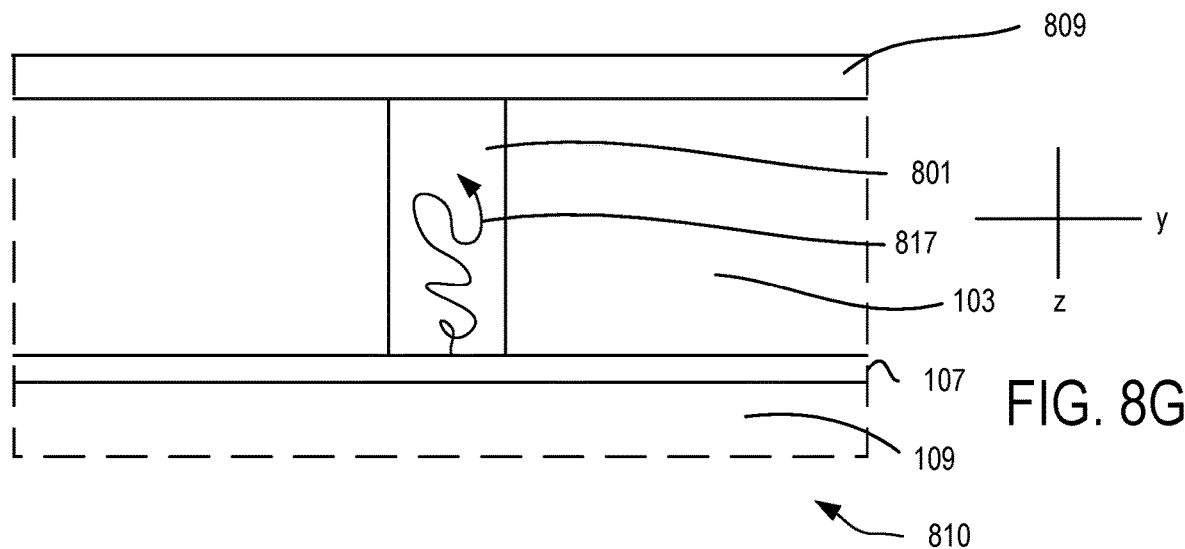

FIG. 8G depicts an embodiment of a layered stack 810 similar to that of FIG. 8C. However, the embodiment depicted in FIG. 8G only includes gap filling material 801 positioned below a layer 809. Embodiments of the layered stack 810 might include layer 809 being a scintillator material. The gap filling material 801 may be comprised of materials that create a tortuous path 817 for permeating water vapor. This tortious path may improve barrier performance.

Figure 8H:
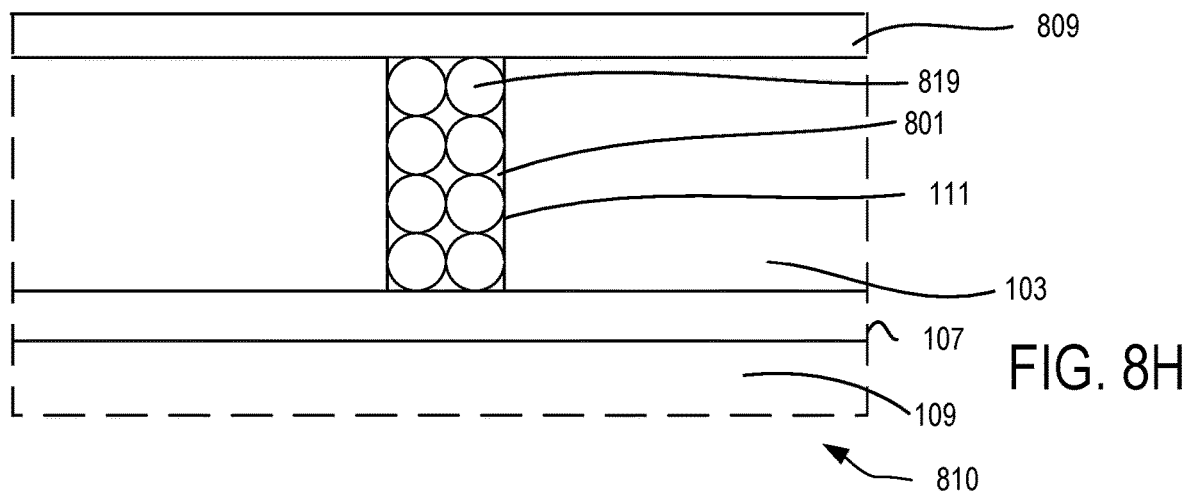

FIG. 8H depicts an embodiment of a layered stack 810 similar to that of FIG. 8G. However, the embodiment depicted in FIG. 8G fills the gap 111 with spheres 813. The spheres 813 may be comprised of inorganic material such as glass. The size of spheres 813 may be based on the size of gap 111 such that the spheres 813 are arranged a particular pattern within the gap 111. FIG. 8H depicts one embodiment where two spheres 813 may fit across the width of gap 111 but many different sizes and arrangements are possible. After spheres 813 are placed within gap 111, the gap filling material 801 may be filled around the spheres 813.

Figure 9A:
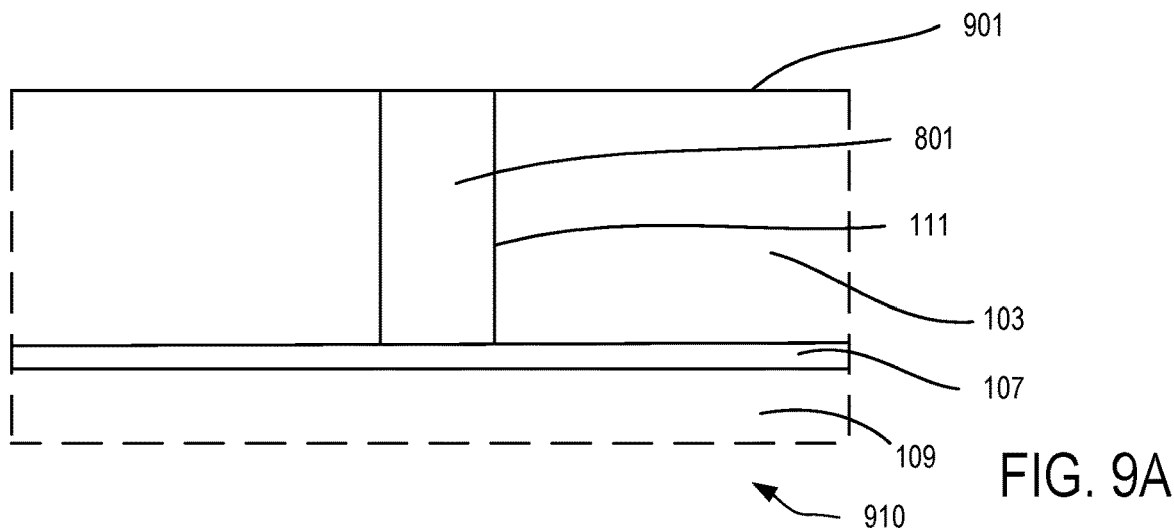
FIGS. 9A-9F depict cross-sectional views of various embodiments of gap filling materials applied to gaps between photosensor tiles.

FIG. 9A depicts an embodiment of a layer stack 910 including gap filling material 801 that terminates approximately flush with a top face 901 of photosensor tiles 103. The top face 901 is opposite a face contacting adhesive 107. In other words, the gap filling material 801 and photosensor tiles 103 have approximately the same height from the adhesive 107 or backing substrate 109 in a z-direction. The flush gap filling material 801 may be applied such that material deposition stops when the gap filling material 801 reaches the top face 901 of photosensor tiles 103. In other embodiments, the gap filling material may be applied to overfill gap 111. Then, an etching process may be applied to remove the overfill of gap filling material 801 to form a flush surface between gap filling material 801 and photosensor tiles 103.

Figure 9B:
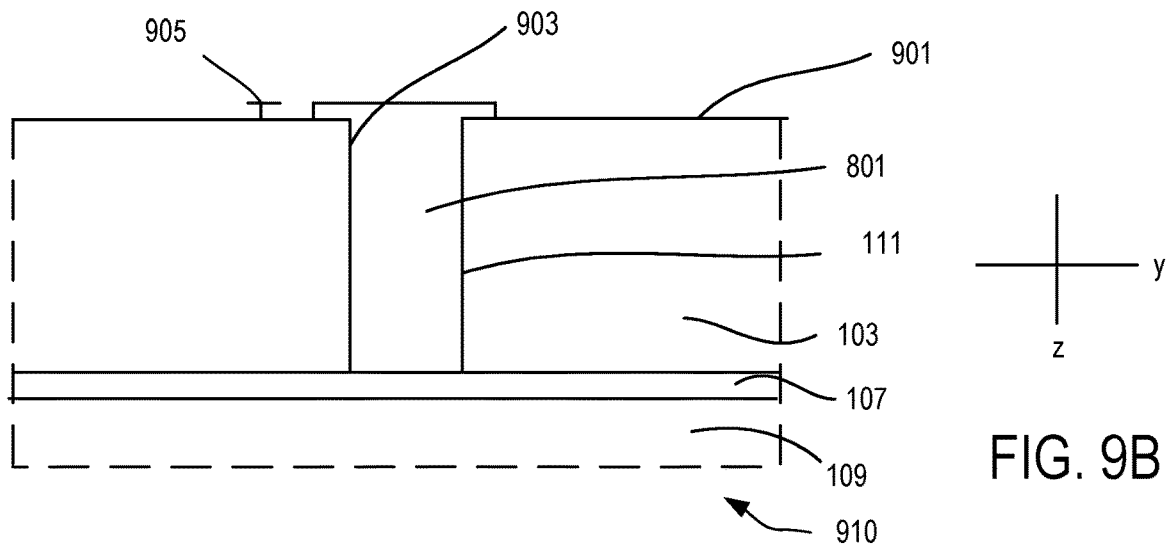

FIG. 9B depicts an embodiment a layer stack 910 including of gap filling material 801 that overfills gap 111 of photosensor tiles 103. In other words, the gap filling material extends along the top face 901 of photosensor tiles 103, depicted in a y-direction. A height 905 of the overfill of gap filling material 801 above top face 901 of photosensor tiles 103 will vary depending on materials and application. Embodiments of the height 905 of the overfill of gap filling material 801 may range between 1-10 μm.

Figure 9C:
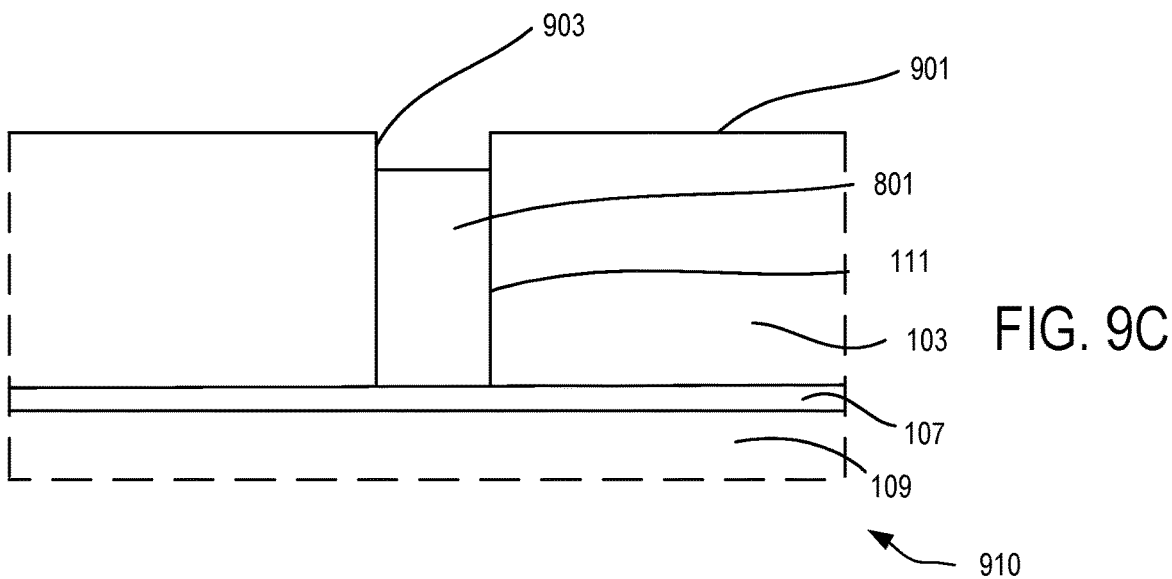

In some embodiments, top faces 901 and/or interior faces 903 within gap 111 of photosensor tiles 103 are treated prior to deposition of gap filling material 801. The treatments of top faces 901 and/or interior faces 903 of photosensor tiles 103 may include wet or dry processing such as oxygen plasma, corona type treatments to improve cleanliness, adhesion, wettability and surface tension of the deposition process. FIG. 9C depicts an embodiment of a layer stack 910 including gap filling material 801 that does not completely fill gap 111. In other words, the gap filling material 801 does not reach the top face 901 of the photosensor tiles 103. In some embodiments, the deposition of gap filling material 801 may be terminated prior to the gap filling material reaching the top face 901. In other embodiments, the gap filling material may be at or above the top face 901 but an etching process removes gap filling material 801 until it is below a level of the top face 901.

Figure 9D:
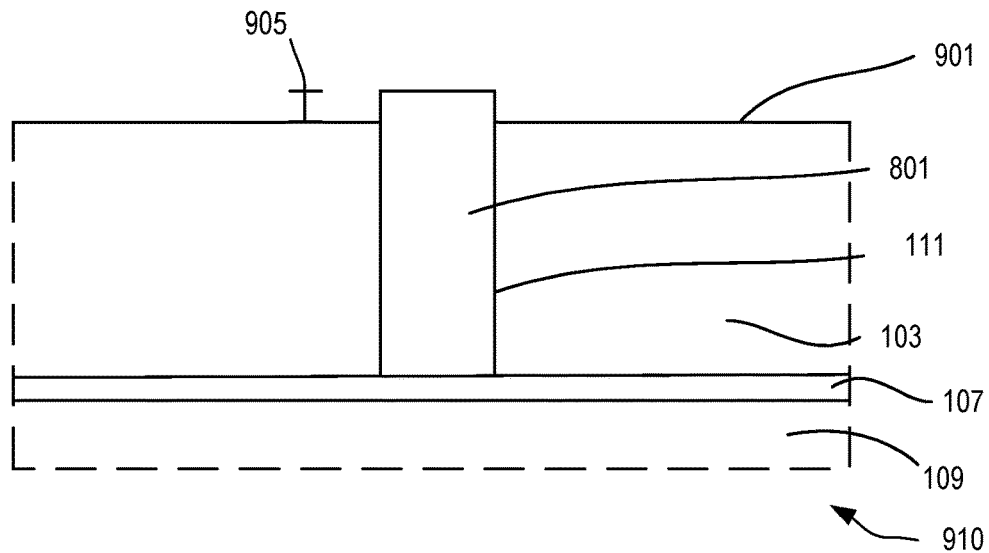

FIG. 9D depicts an embodiment of a layer stack 910 similar to the embodiment depicted in FIG. 9B. However, the overfill of gap filling material 801 in the embodiment of FIG. 9D does not extend along the top face 901 of photosensor tiles 103. A height 905 of the overfill of gap filling material 801 above top face 901 of photosensor tiles 103 will vary depending on materials and application. Embodiments of the height 905 of the overfill of gap filling material 801 may range between 1-10 μm.

Figure 9E:
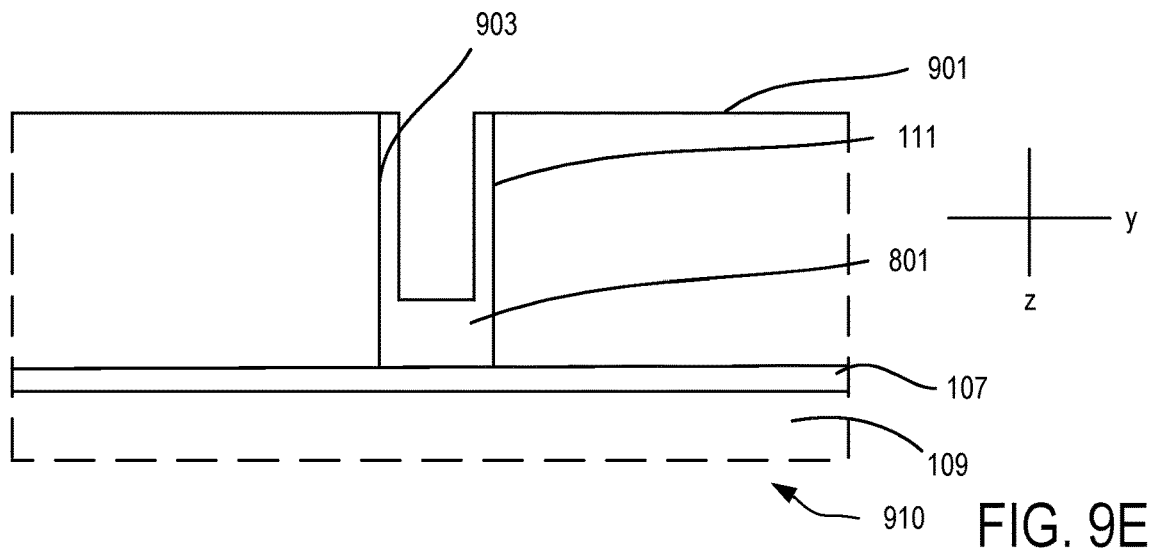

FIG. 9E depicts an embodiment of a layer stack 910 including gap filling material 801 that extends along interior faces 903 of gap 111. However, the gap filling material only reaches the level of the top face 901 of photosensor tiles 103 along the interior faces 903. Near a midpoint of the gap 111 the gap filling material does not reach the level of top face 901. This embodiment of gap filling material 801 may occur during particular methods of deposition such as plasma enhanced chemical vapor deposition (PECVD).

Figure 9F:
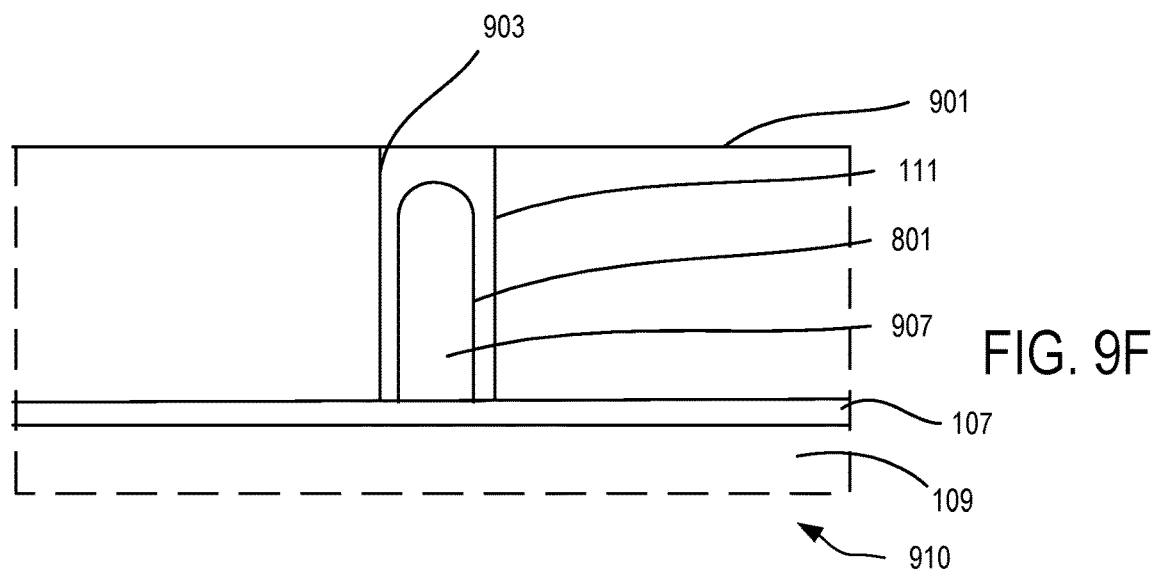

FIG. 9F depicts an embodiment of a layer stack 910 including gap filling material 801 that extends along interior faces 903 of gap 111 and is flush with top face 901 of photosensor tiles 103. However, the interior of gap filling material 801 may be hollow or form a void 907. In other words, the gap filling material may only be present along interior faces 903 of gap 111 in portions of the gap filling material. This embodiment of gap filling material 801 may occur during particular methods of deposition where the gap filling material grows outward from interior faces 903 of the gap 111 and seals the top of gap 111 before the gap can be completely filled.

Figure 10A:
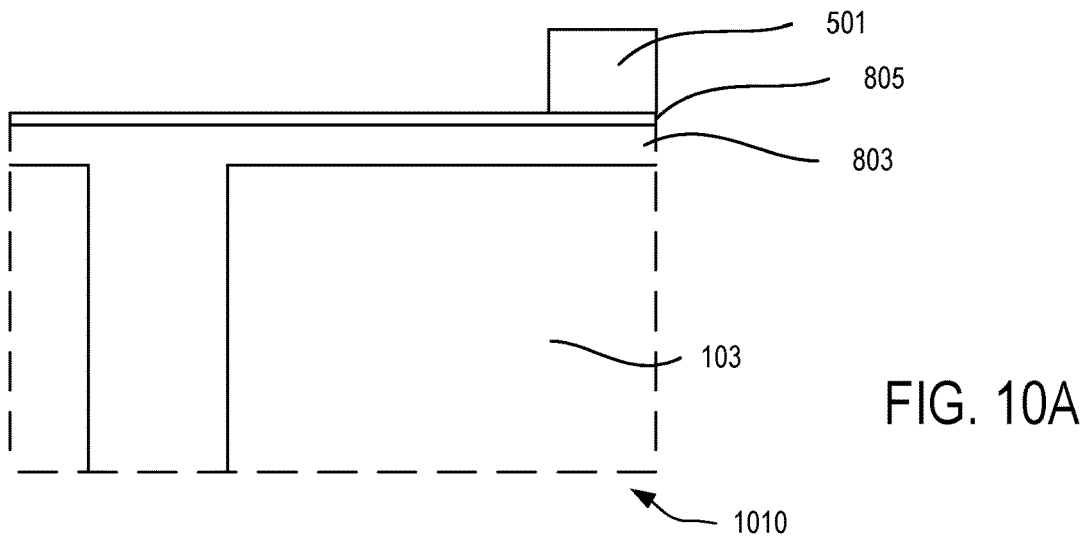
FIGS. 10A-10D depict cross-sectional views of various embodiments of application of perimeter seals.

FIG. 10A depicts an embodiment of coated photosensors 1010 including perimeter seal 501 positioned on barrier coating 805. Barrier coating 805 and leveling coating 803 extend underneath of the perimeter seal 501. Barrier coating 805 is positioned on a leveling coating 803.

Figure 10B:
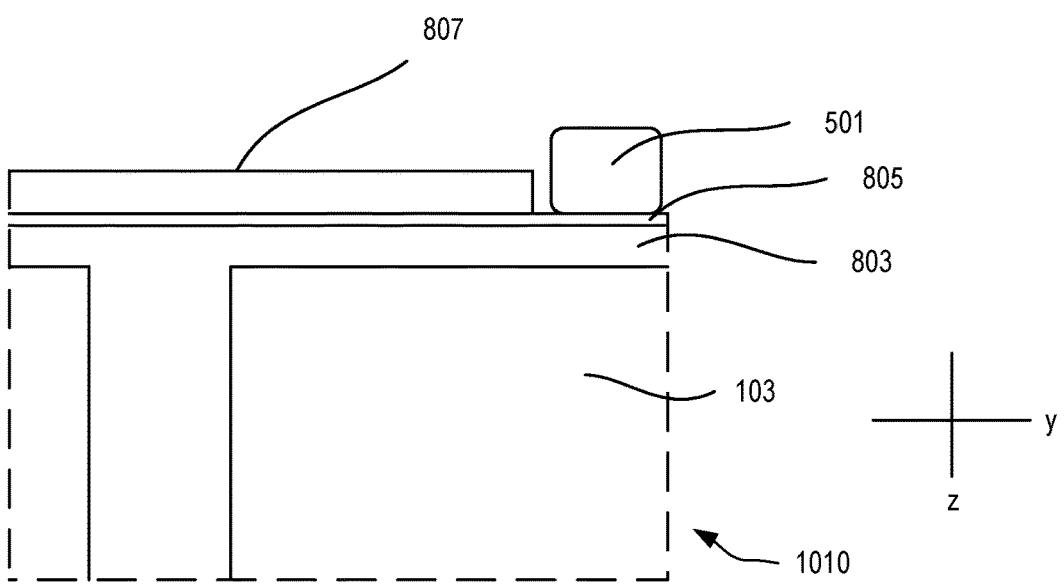

FIG. 10B depicts an embodiment of coated photosensors 1010 including perimeter seal 501 positioned on barrier coating 805. However, the embodiment of FIG. 10B also includes a protective coating 807 positioned on the barrier coating 805. Embodiments of the protective coating 807 do not extend to contact the perimeter seal 501. The perimeter seal 501 may also have rounded corners as depicted in FIG. 10B.

Figure 10C:
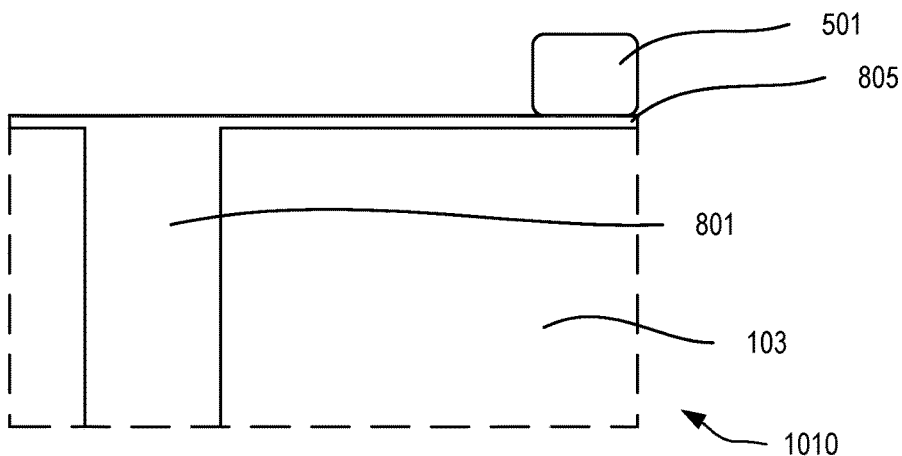

FIG. 10C depicts an embodiment coated photosensors 1010 similar to the embodiment of FIG. 10A. FIG. 10C depicts an embodiment of perimeter seal 501 positioned on barrier coating 805. However, barrier coating 805 is positioned on photosensor tiles 103 and gap filling material 801. A leveling coating is not used in the embodiment of FIG. 10C. Barrier coating 805 extends underneath of the perimeter seal 501.

Figure 10D:
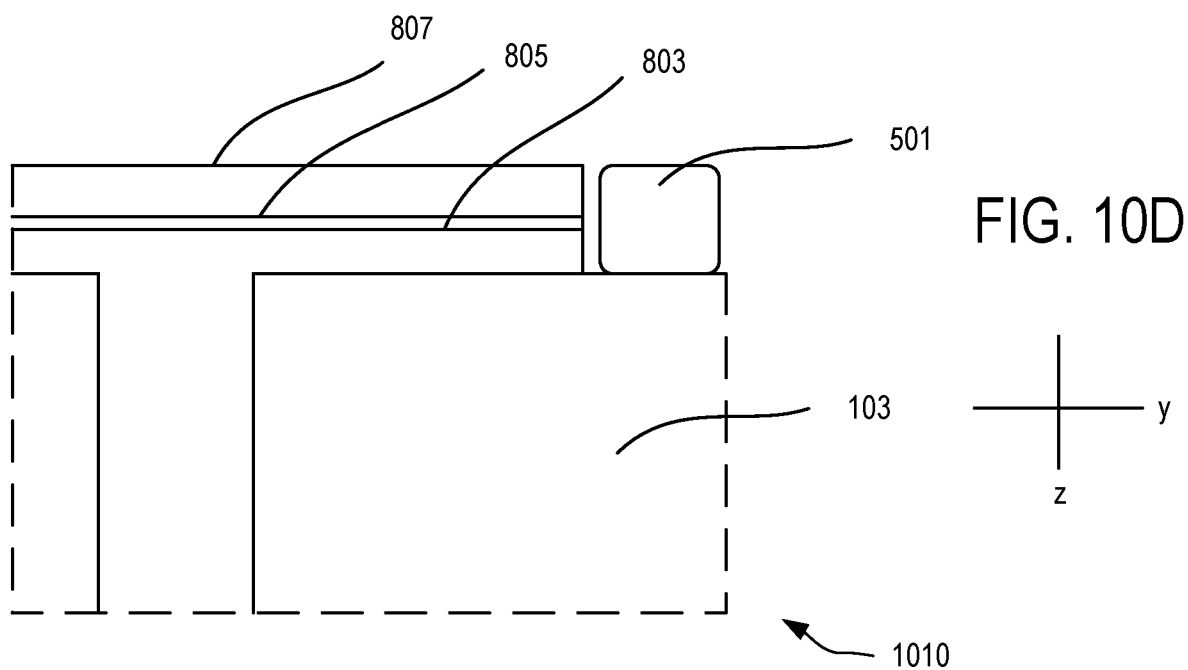

FIG. 10D depicts an embodiment of coated photosensors 1010 including a perimeter seal 501 positioned on photosensor tile 103. In the embodiment of FIG. 10D, the leveling coating 803, barrier coating 805, and protective coating 807 are all positioned within the perimeter seal 501. However, in the depicted embodiment none of the leveling coating 803, barrier coating 805, and protective coating 807 contact perimeter seal 501.

Figure 12:
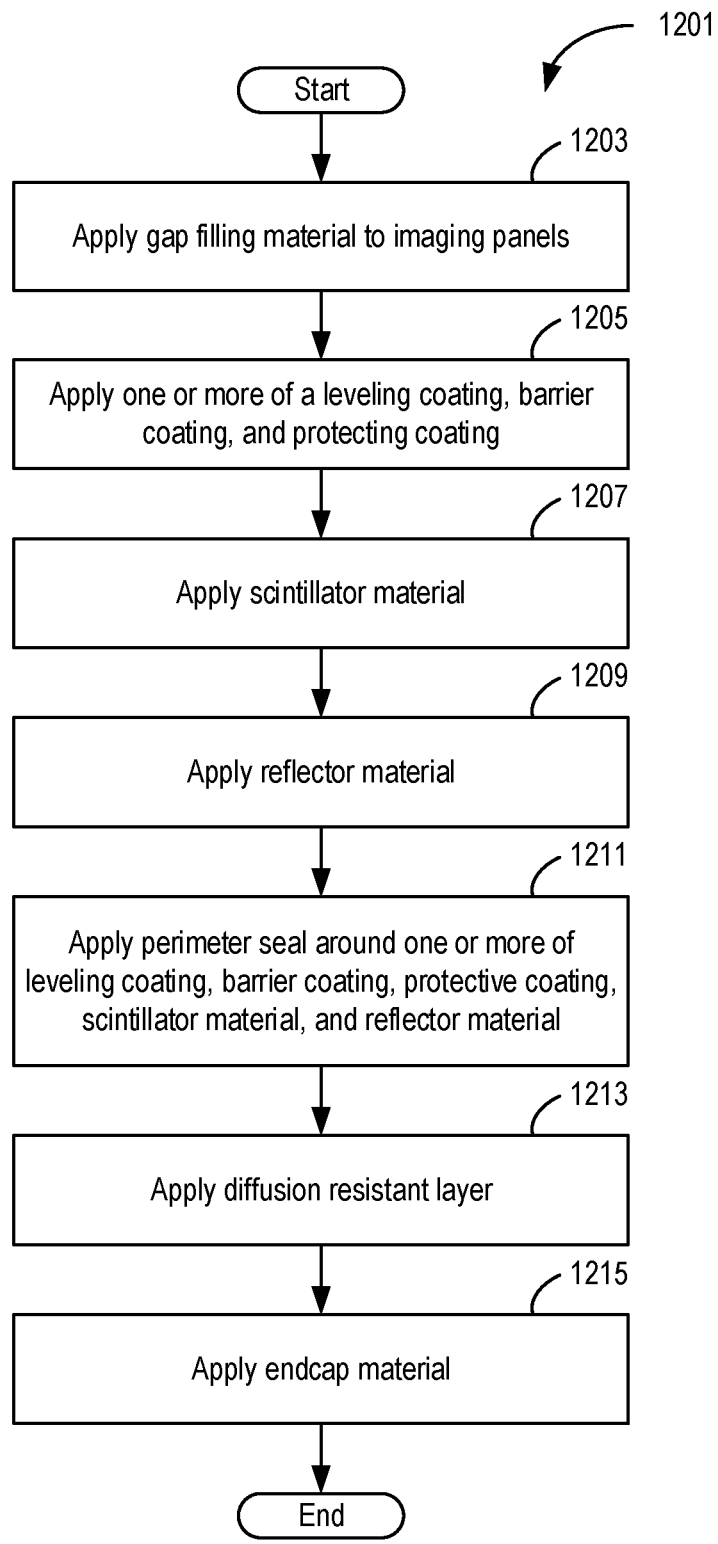
FIG. 12 depicts an embodiment of a method for forming an X-ray detector.

FIG. 12 depicts an embodiment of a method 1201 for producing an X-ray detector. In step 1203, a gap filling material is applied to photosensor tiles. As discussed with regards to FIG. 1, an array of photosensor tiles may be required in order to create an X-ray detector. Gaps between photosensor tiles may cause problems during manufacturing and degradation of images produced. The gap filling material fills at least part of the gap between photosensor tiles before further manufacturing steps are carried out. FIGS. 9A-9F depict different positioning that the gap filling material may occupy in the gaps between photosensor tiles.

Step 1203 may be performed by several methods of precision liquid dispensing. Methods similar to inkjet printing, including pico-liter inkjet printing, can be used to apply the gap filling material. Other embodiments of the application may apply the gap filling material and leveling coating with a single deposition process. These embodiments will be discussed in further detail in regard to FIG. 14.

In step 1205, one or more of a leveling coating, barrier coating, and protecting coating are applied to the photosensor tiles and gap filling material. FIGS. 8A-8H depict some of the embodiments of combinations of leveling coating, barrier coatings, and protective coatings that can be formed in step 1205. FIGS. 8A-8H also depict different embodiments of combinations of gap filling material positioned and leveling coating, barrier coatings, and protective coatings that can be formed in step 1205.

The method of application in step 1205 may be one or more of several methods of precision liquid dispensing including inkjet printing and pico-liter inkjet printing. Other possible methods of application are parylene deposition, spin coating, slot die coating, meniscus coating, dip coating, and flash evaporation.

Methods of applying barrier coatings include but not limited to Plasma enhanced chemical vapor deposition, atomic layer deposition (ALD), physical vapor deposition methods such as sputtering, reactive sputtering, thermal evaporation, electron beam, evaporation, flash evaporation.

As discussed above, the gap filling material, leveling coating, barrier coatings, and protective coatings may include organic materials. Organic and polymeric materials may require curing. Possible methods of curing these layers and coatings may be radiation curing, ultraviolet curing, thermal curing or combinations thereof.

In step 1207, a scintillator layer is applied. The scintillator may be applied above a barrier coating. Some embodiments of the application may apply a specific barrier coating while other embodiments may apply a single barrier layer including a barrier coating. In both types of embodiments, the scintillator layer is applied above the barrier coating which provides protection from water vapor and other potentially detrimental substances along a face of the scintillator on the side of the photosensor tiles. More details about the configuration of embodiments of the scintillator layer are provided in FIG. 3 and the accompanying description.

In step 1209, a reflector layer is applied. Embodiments including a reflector layer may position the reflector layer on a side of the scintillator layer opposite the photosensor tiles. The reflector layer may prevent ambient light from reaching the photosensor tiles and interfering with a signal.

In step 1211, a perimeter seal is placed around the scintillator layer. The perimeter seal may also surround other layers such as the reflector layer. In some embodiments, the perimeter seal is placed on a barrier coating or levelling layer including a barrier coating. In other embodiments, the perimeter seal is placed directly on the photosensor tiles. In embodiments where the perimeter seal is placed on the photosensor tiles, the barrier coating and/or barrier layer will be positioned within the perimeter seal. This positioning of the perimeter seal prevents or postpones water and other problematic substances from entering the scintillator layer from the directions of the side faces of the scintillator layer, depicted in the x-axis and y-axis of FIG. 5. FIG. 5 and the corresponding description include more details about configurations of the perimeter seal.

Methods of application of the perimeter seal include common epoxy or other substantially organic material dispensing techniques. These techniques may be followed by UV, thermal or electron beam curing. Methods of application are not limited to the above.

In step 1213, a diffusion reducing layer is applied. The diffusion reducing layer is applied on a side of the scintillator layer opposite the barrier coating or barrier layer. The diffusion reducing layer contacts the perimeter seal. Therefore, after the application of the diffusion reducing layer, the scintillator layer is protected from water molecules by structures positioned along each face of the scintillator layer.

In step 1215, an endcap material is applied. The end cap may be applied to one or more sides of a X-ray detector. Further details of the endcap are provided in FIG. 7 and the corresponding description.

Figure 13:
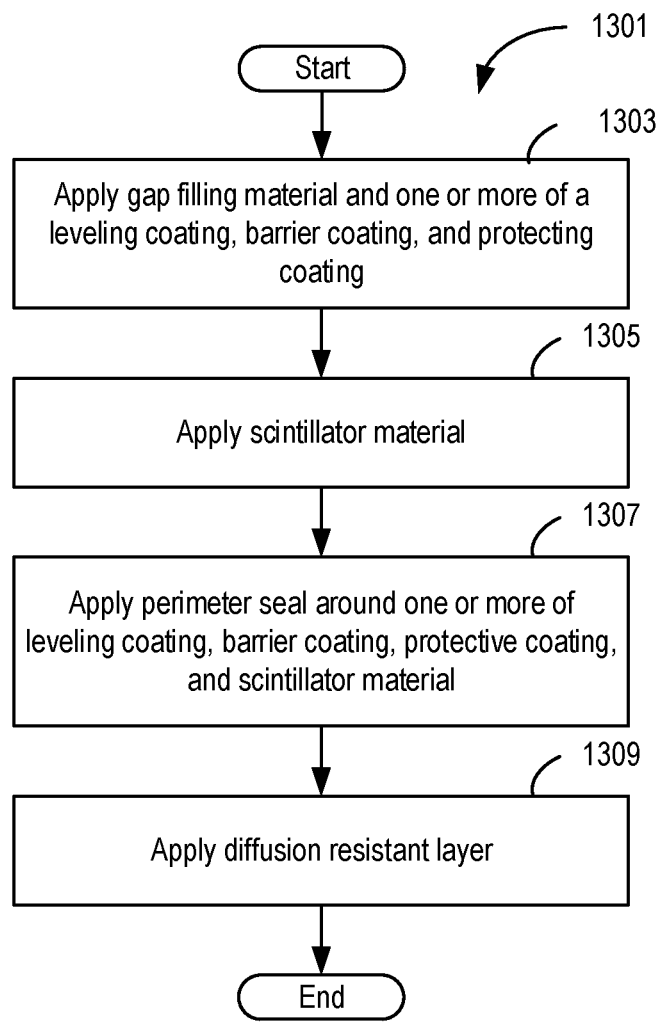
FIG. 13 depicts an embodiment of a method for forming an X-ray detector.

FIG. 13 depicts another method 1301 of forming an X-ray detector. In step 1303, a gap filling material and one or more of a leveling coating, barrier coating, and protecting coating are applied to photosensor tiles. In some embodiments, gap filling material and leveling coating may be applied in a single process. In other embodiments, the gap filling material, leveling coating, and a barrier coating may all comprise a single barrier layer. In further embodiments, a protective coating may be applied onto a barrier layer or barrier coating. Specific configurations of embodiments of layers similar to those of step 1303 are described in regards to FIGS. 2 and 8A-8H.

In step 1305, a scintillator layer is applied. The scintillator may be applied above a barrier coating. Some embodiments of the application may apply a specific barrier coating while other embodiments may apply a single barrier layer including a barrier coating. In both types of embodiments, the scintillator layer is applied above the barrier coating which provides protection from water and other problematic substances along a face of the scintillator on the side of the photosensor tiles. More details about the configuration of embodiments of the scintillator layer are provided in FIG. 3 and the accompanying description.

In step 1307, a perimeter seal is placed around the scintillator layer. The perimeter seal may also surround other applied layers. In some embodiments, the perimeter seal is placed on a barrier coating or levelling layer including a barrier coating. In other embodiments, the perimeter seal is placed directly on the photosensor tiles. In embodiments where the perimeter seal is placed on the photosensor tiles, the barrier coating or barrier layer will be positioned within the perimeter seal. FIG. 5 and the corresponding description include more details about configurations of the perimeter seal.

In step 1309, a diffusion resistant layer is applied. The diffusion resistant layer is applied on a side of the scintillator layer opposite the barrier coating or barrier layer. The diffusion resistant layer contacts the perimeter seal. Therefore, after the application of the diffusion resistant layer, the scintillator layer is protected from diffusion of water and other undesired substances by structures positioned along each face of the scintillator layer.

Figure 14:
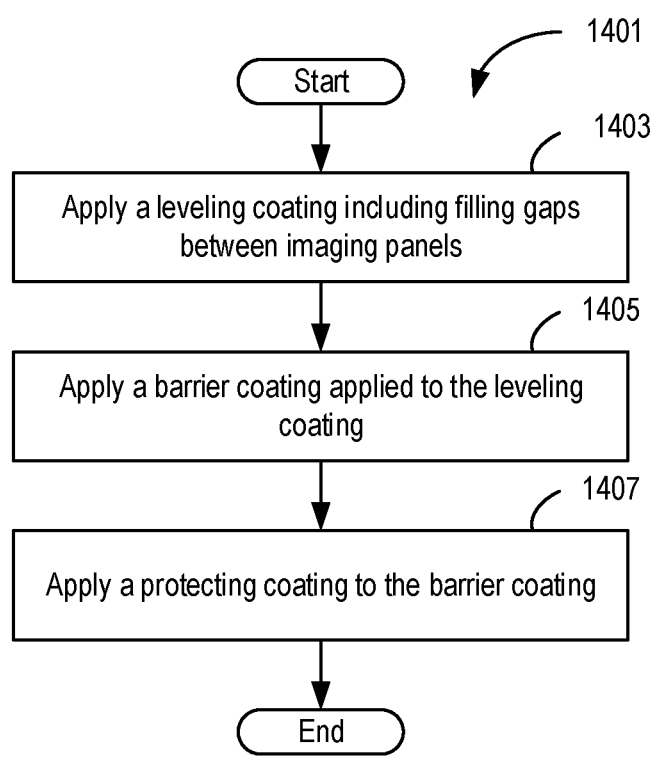
FIG. 14 depicts an embodiment of a method for forming an X-ray detector.

FIG. 14 depicts a method 1401 of applying specific coatings which may be applied on a top face of photosensor tiles. In step 1403, a leveling coating is applied to photosensor tiles and the leveling coating fills gaps between photosensor tiles. In step 1405, a barrier coating is applied to the leveling coating. In step 1407, a protective coating is applied to the barrier coating. Detailed description of these specific coatings and the configurations of the coatings can be found in FIGS. 2 and 8A-8H and the corresponding descriptions.

In this way, the embodiments of the application provide gap filling material and/or a barrier layer on the photosensor tiles which provides a planar surfaces for subsequent materials to be deposited on. Embodiments of the application further include structures such as the barrier layer, barrier coating, perimeter seal, and diffusion resistant layer which are positioned around the scintillator material. The technical effect of providing a planar surface and barrier structures surrounding the scintillator layer is to prevent anomalous growth of materials near gaps between photosensor tiles and prevent ingress of water and other substances from entering scintillator materials.

FIGS. 1-11B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the coatings and/or layers may be applied to many configurations of photosensor tiles. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the value or range unless otherwise specified.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An X-Ray detector comprising:
    at least two tiled photosensors;
    a gap filling material positioned in at least one gap between two or more photosensor tiles;
    barrier layer comprising inorganic material, a leveling coating, a barrier coating, and a protective coating, wherein a first face of the barrier layer extends across the at least one gap and a face of each of the two or more photosensor tiles;
    a first face of a scintillator layer positioned on a second face of the barrier layer, and a perimeter seal surrounding the scintillator layer; and
    a first face of a diffusion resistant layer positioned over a second face of the scintillator layer opposite the first face of the scintillator layer.

2. The X-ray detector of claim 1, wherein the perimeter seal is positioned on the barrier layer.

3. The X-ray detector of claim 2, wherein the perimeter seal is positioned on the barrier coating.

4. The X-ray detector of claim 1, wherein the perimeter seal surrounds a perimeter of the scintillator layer and a reflector is positioned over the diffusion resistant layer.

5. The X-ray detector of claim 1, wherein the gap filling coating, leveling coating and protective coating are composed of substantially organic material and the barrier coating is composed of at least one continuous inorganic coating.

6. The X-ray detector of claim 1, wherein the gap filling material extends beyond a top face of the two or more photosensor tiles.

7. An imaging device comprising an X-Ray detector, the X-ray detector comprising:
    a gap filling material positioned in at least one gap between two or more photosensor tiles;
    a barrier layer comprising inorganic material, a leveling coating, a barrier coating, and a protective coating, wherein a first face of the barrier layer extends across the at least one gap and a face of each of the two or more photosensor tiles;
    a first face of a scintillator layer positioned on a second face of the barrier layer;
    a first face of a diffusion resistant layer positioned over to a second face of the scintillator layer; and
    a perimeter seal positioned on the first face of the diffusion resistant layer and the second face of the barrier layer, and the perimeter seal surrounding the x-ray sensitive material.

8. The imaging device of claim 7, further comprising a reflector layer positioned between the second face of the scintillator layer and the first face of the diffusion resistant layer.

9. The imaging device of claim 8, comprising four or more photosensor tiles and the gap filling material filling each gap between photosensor tiles.

10. The imaging device of claim 7, wherein a first of the photosensor tiles is larger than a second of the photosensor tiles.

11. The imaging device of claim 7, wherein the gap filling material does not extend to a top face of each of the two or more photosensor tiles.

12. The imaging device of claim 7, wherein the gap filling material extends beyond the gap between the two or more photosensor tiles, and the gap filling material extends along a top face of each of the two or more photosensor tiles.

13. The imaging device of claim 7, wherein the gap filling material comprises spheres surrounded by an organic material.

14. A method of forming an X-ray detector comprising:
applying a gap filling material to photosensor tiles, the gap filling material filling gaps between the photosensor tiles;
applying a barrier layer to the photosensor tiles, the barrier layer comprising inorganic material, a leveling coating, a barrier coating, and a protective coating, wherein a first face of the barrier layer extends across the gaps between the photosensor tiles and a face of each of the photosensor tiles;
applying a scintillator layer to the barrier layer;
applying a perimeter seal around the scintillator layer; and
applying a diffusion resistant layer to extend across the perimeter seal and scintillator layer.

15. The method of claim 14, wherein the barrier layer is comprised of a substantially organic material layer and a substantially inorganic material layer.

16. The method of claim 14, wherein the gap filling material creates a tortuous path for material passing through the gaps between the photosensor tiles.

17. The method of claim 14, wherein the gap filling material does not completely fill the gaps between the photosensor tiles.

18. The method of claim 14, further comprising etching a portion of the gap filling material extending beyond gaps between the photosensor tiles.

* * * * *